United States Patent
Gao et al.

(10) Patent No.: US 11,941,910 B2
(45) Date of Patent: *Mar. 26, 2024

(54) USER INTERFACE DISPLAY METHOD OF TERMINAL, AND TERMINAL

(71) Applicant: Huawei Technologies Co., Ltd., Shenzhen (CN)

(72) Inventors: Weiqiang Gao, Shenzhen (CN); Chuang Cui, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/948,463

(22) Filed: Sep. 20, 2022

(65) Prior Publication Data

US 2023/0017370 A1 Jan. 19, 2023

Related U.S. Application Data

(63) Continuation of application No. 17/255,788, filed as application No. PCT/CN2018/092680 on Jun. 25, 2018, now Pat. No. 11,482,037.

(51) Int. Cl.
| | |
|---|---|
| *G06V 40/13* | (2022.01) |
| *G06F 3/0488* | (2022.01) |
| *G06F 21/32* | (2013.01) |
| *G06V 40/12* | (2022.01) |
| *H04M 1/72463* | (2021.01) |

(52) U.S. Cl.
CPC ........ *G06V 40/1365* (2022.01); *G06F 3/0488* (2013.01); *G06F 21/32* (2013.01); *H04M 1/724631* (2022.02)

(58) Field of Classification Search
None
See application file for complete search history.

(56) References Cited

U.S. PATENT DOCUMENTS

| | | |
|---|---|---|
| 10,685,100 B2 | 6/2020 | Chen et al. |
| 2013/0263251 A1 | 10/2013 | Fleizach et al. |
| 2014/0055369 A1 | 2/2014 | Li |
| 2015/0135108 A1 | 5/2015 | Pope et al. |
| 2016/0026236 A1 | 1/2016 | Wasistha et al. |
| 2016/0110037 A1 | 4/2016 | Moriai et al. |
| 2018/0046366 A1 | 2/2018 | Li et al. |
| 2018/0088759 A1 | 3/2018 | Goldberg et al. |

(Continued)

FOREIGN PATENT DOCUMENTS

| | | |
|---|---|---|
| CN | 104143060 A | 11/2014 |
| CN | 104717349 A | 6/2015 |

(Continued)

*Primary Examiner* — Joseph R Haley
(74) *Attorney, Agent, or Firm* — Conley Rose, P.C.

(57) ABSTRACT

A user interface display method of a terminal includes receiving, by the terminal, a first operation from a user to unlock the terminal when a screen of the terminal is off or the terminal displays a first interface, where the first interface is a lock screen of the terminal, displaying, by the terminal, a third user interface when the first operation meets a preset unlock condition and when the user continues to operate the terminal after entering the first operation, receiving, by the terminal in the third user interface, a second operation from the user, and executing a function corresponding to the second operation.

20 Claims, 34 Drawing Sheets

(56) References Cited

U.S. PATENT DOCUMENTS

| | | | |
|---|---|---|---|
| 2018/0260545 A1 | 9/2018 | Chen et al. | |
| 2018/0330146 A1 | 11/2018 | Wang et al. | |
| 2019/0369695 A1 | 12/2019 | Wang et al. | |
| 2022/0253144 A1* | 8/2022 | Hu | G06V 40/168 |

FOREIGN PATENT DOCUMENTS

| | | |
|---|---|---|
| CN | 105159677 A | 12/2015 |
| CN | 105893033 A | 8/2016 |
| CN | 106133748 A | 11/2016 |
| CN | 106415471 A | 2/2017 |
| CN | 106484433 A | 3/2017 |
| CN | 107306311 A | 10/2017 |
| CN | 107918506 A | 4/2018 |
| CN | 107943362 A | 4/2018 |
| CN | 107992241 A | 5/2018 |
| CN | 108139864 A | 6/2018 |
| EP | 3270279 A1 | 1/2018 |
| IN | 105447369 A | 3/2016 |

* cited by examiner

USER INTERFACE DISPLAY METHOD OF TERMINAL, AND TERMINAL

CROSS-REFERENCE TO RELATED APPLICATIONS

This application is continuation of U.S. patent application Ser. No. 17/255,788, filed on Dec. 23, 2020, which is a National Stage of International Application No. PCT/CN2018/092680, filed on Jun. 25, 2018. Both of the aforementioned applications are hereby incorporated by reference in their entireties.

TECHNICAL FIELD

This application relates to the field of user interface technologies, and in particular, to a user interface (User Interface, UI for short) display method of a terminal, and a terminal.

BACKGROUND

In the prior art, as shown in FIG. 1, to prevent a misoperation of a user or protect user privacy, a terminal usually displays a lock screen 1 after a screen of the terminal is lit up, and the terminal is in a lock screen state. If the terminal is not unlocked, the user cannot enter an unlocked interface to use a complete function of the terminal. Only after unlocking, the user can use the complete function of the terminal, for example, use a system function of the terminal or an installed application program ("application" or "APP" for short). The user can unlock the terminal in a plurality of manners, such as sliding to unlock, fingerprint unlocking, iris unlocking, and facial recognition unlocking. For example, referring to FIG. 3A, the terminal has a rear-facing fingerprint module 3. As shown in FIG. 3B, in the lock screen 1, the user needs to perform at least one operation of touching or pressing the rear-facing fingerprint module 3 for unlocking. As shown in FIG. 3C and FIG. 3D, after unlocking, the terminal displays an unlocked interface. In this case, the user further needs to perform at least another operation to trigger the terminal to execute a function of an operating system. For example, the user needs to tap an icon of an application, for example, WeChat, in the unlocked interface to open the application.

In addition, some terminals provide, in lock screens, some application quick entries that do not relate to user privacy and security, for example, provide a shortcut of "Camera" (for example, an icon of "Camera") in the lock screens. As shown in FIG. 4A, FIG. 4B, and FIG. 4C, the user can tap the shortcut, or touch and hold the shortcut and drag the shortcut along a preset direction by a distance, to open the "Camera" application and use a photographing function of "Camera". In this case, the user can use the "Camera" application, but cannot use the complete function of the terminal within rights of the user because the operating system of the terminal is not unlocked. After the "Camera" application entered by using this shortcut is exited, the terminal still keeps a lock screen state. For example, the terminal returns to the lock screen 1, and prompts the user to unlock the terminal.

It can be learned from the foregoing description that in the prior art, a user cannot use a continuous operation to both unlock a screen of a terminal and execute a function (for example, open an application), and therefore the user has poor operation experience.

SUMMARY

Embodiments of this application provide a user interface display method of a terminal, and a terminal, so that a user can use a coherent operation to both unlock a terminal and enable the terminal to execute a function, thereby improving operation efficiency.

To achieve the foregoing objective, the following technical solutions are used in the embodiments of this application:

According to a first aspect, an embodiment of this application provides a user interface display method of a terminal, including: when a screen of the terminal is off or the terminal displays a first interface, the terminal receives a first operation that is entered by a user to unlock the terminal, where the first interface is a lock screen of the terminal; the terminal displays a third user interface when determining that the first operation meets a preset unlock condition and that the user does not stop operating the terminal after entering the first operation; and in the third user interface, the terminal receives a second operation entered by the user, and executes a function corresponding to the second operation.

In this embodiment of this application, the terminal provides the third user interface when determining that the user does not stop operating the terminal after entering the unlock operation, and the second operation is entered in the interface, so that the terminal can directly execute the function corresponding to the second operation. Therefore, the user can continuously enter the first operation and the second operation without stopping operating the terminal; in other words, the user can use a coherent operation to both unlock the terminal and enable the terminal to execute a function, thereby improving operation efficiency.

In a possible design method, that the terminal determines that the first operation meets a preset unlock condition is specifically: the terminal determines that the first operation is a sliding operation detected on a touch sensor; or the terminal determines that the first operation is an operation of drawing a pattern in the unlock interface by using a touch sensor, and that the pattern matches a preset pattern; or the terminal determines that the first operation is an operation of entering a fingerprint by using a fingerprint sensor, and that the entered fingerprint matches a preset fingerprint; or the terminal determines that the first operation is an operation of entering an iris by using an iris sensor, and that the entered iris matches a preset iris; or the terminal determines that the first operation is an operation of entering a face image by using a face sensor, and that the entered face image matches a preset face.

In a possible design method, the method may further include: the terminal displays a second user interface if the first operation meets the preset unlock condition and the user stops operating the terminal after entering the first operation, where the second user interface is an unlocked user interface of the terminal.

In a possible design method, the terminal receives the first operation by using a first sensor, and that the terminal determines that the user does not stop operating the terminal after entering the first operation includes: after receiving, by using the first sensor, the first operation that meets the preset unlock condition, the terminal detects that the user keeps operating the first sensor.

In a possible design method, the first sensor is a fingerprint sensor, and the receiving the first operation that meets the preset unlock condition is specifically: collecting, by using the fingerprint sensor, a fingerprint entered by the user, where the fingerprint entered by the user matches a preset fingerprint; and the detecting that the user keeps operating the first sensor includes: the terminal determines whether duration of a press or touch operation performed by the user on the fingerprint sensor is greater than first threshold duration; and if the duration is greater than the first threshold duration and the collected fingerprint matches the preset fingerprint, after determining that the user enters the first operation that meets the preset unlock condition, the terminal detects that the user keeps operating the first sensor; or the terminal determines whether duration during which the user operates the sensor after the user determines that the collected fingerprint matches the prestored fingerprint is greater than second threshold duration; and if the duration is greater than the second threshold duration, the terminal determines that the user keeps operating the first sensor after entering the first operation that meets the preset unlock condition.

In a possible design method, the terminal receives the first operation by using a first sensor, and receives, by using a second sensor, a third operation entered by the user; and that the terminal determines that the user does not stop operating the terminal after entering the first operation includes: if the terminal detects, before detecting the first operation that meets the preset unlock condition, that the user starts to enter the third operation and that duration during which the third operation exists after the first operation is greater than third threshold duration, the user does not stop the input operation on the terminal after entering the first operation.

In a possible design method, the first sensor is a fingerprint sensor, the second sensor is a touch sensor, and that the terminal detects, before detecting the first operation that meets the preset unlock condition, that the user starts to enter the third operation is specifically: before detecting, by using the fingerprint sensor, a fingerprint that matches a preset fingerprint, the terminal detects a touch operation that is entered by the user by using the touch sensor; and that duration during which the third operation exists after the first operation is greater than third threshold duration is specifically: after the terminal detects, by using the fingerprint sensor, the fingerprint that matches the preset fingerprint, duration of the touch operation that is entered by the user by using the touch sensor exceeds the third threshold duration.

In a possible design method, one or more shortcuts are displayed in the third user interface, and each of the one or more shortcuts corresponds to one function in the terminal; and the receiving a second operation entered by the user, and executing a function corresponding to the second operation is specifically: the terminal receives the second operation entered by the user, and determines that the second operation is used to trigger a first shortcut in the one or more shortcuts; and executes a function corresponding to the first shortcut.

In a possible design method, the displaying a third user interface includes: if a touchscreen of the terminal detects a touch operation of the user when the terminal determines that the first operation meets the preset unlock condition and that the user does not stop operating the terminal after entering the first operation, the terminal displays the one or more shortcuts in the third interface based on a location of a touch point of the touch operation of the user on the touchscreen.

In a possible design method, the receiving a second operation entered by the user, and executing a function corresponding to the second operation is specifically: receiving a first gesture entered by the user, and determining, based on a preset correspondence between a gesture and a function of the terminal, a first function corresponding to the first gesture entered by the user; and executing the first function.

In a possible design method, mapping information is displayed in the third user interface, and the mapping information is used to indicate a gesture corresponding to one or more functions.

In a possible design method, the third user interface is displayed on the second user interface in a superimposed manner, the second user interface displayed under the third user interface does not respond to a user operation, and the second user interface is an unlocked user interface of the terminal.

In a possible design method, before the terminal executes the function corresponding to the second operation, the method further includes: the terminal determines that the terminal continuously detects, within a time period from time at which the first operation is detected to time at which the second operation is detected, an input operation performed by the user on the terminal.

In a possible design method, the first sensor is a fingerprint sensor, the second sensor is a touch sensor, and both the second operation and the third operation are entered by using the touch sensor.

In a possible design method, before the executing a function corresponding to the second operation, the method further includes: the terminal determines that the user continuously performs an input operation during the third operation and the second operation by using the touch sensor.

In a possible design method, the first operation is an operation that the user enters a fingerprint by using an in-screen fingerprint sensor, where the in-screen fingerprint sensor is configured to detect a fingerprint entered by the user in a screen display area; the determining that the first operation meets a preset unlock condition is specifically: the terminal determines that a fingerprint entered by the user by using the fingerprint sensor matches a preset fingerprint; and that the terminal determines that the user does not stop operating the terminal after entering the first operation is specifically: the terminal determines that the user still keeps touching the screen of the terminal with a finger after entering the matched fingerprint, where the second operation is an operation entered by the user when the user keeps touching the screen with the finger after entering the first operation.

According to a second aspect, an embodiment of this application provides a terminal. The terminal includes: an interactive device, configured to: when the terminal is in a screen-off state or displays a first interface, receive a first operation that is entered by a user to unlock the terminal, where the first interface is a lock screen of the terminal; a processor, configured to determine whether the first operation meets a preset unlock condition and whether the user does not stop operating the terminal after entering the first operation; and a display device, configured to display a third user interface when the processor determines that the first operation meets the preset unlock condition and that the user does not stop operating the terminal after entering the first operation, where the interactive device is further configured to: when the terminal displays the third user interface, receive a second operation entered by the user; and the processor is further configured to control the terminal to execute a function corresponding to the second operation.

In a possible design method, the display device is further configured to display a second user interface when the processor determines that the first operation meets the preset unlock condition and that the user stops operating the terminal after entering the first operation, where the second user interface is an unlocked user interface of the terminal.

In a possible design method, the interactive device includes: a first sensor, configured to receive the first operation; and that the processor determines that the user does not stop operating the terminal after entering the first operation includes: the processor determines that the first sensor continuously detects an operation of the user after the first sensor receives the first operation that meets the preset unlock condition.

In a possible design method, the first sensor is a fingerprint sensor, and is specifically configured to collect a fingerprint entered by the user; that the processor determines that the first sensor receives the first operation that meets the preset unlock condition is specifically: the processor determines that a fingerprint collected by the fingerprint sensor matches a preset fingerprint; and that the processor determines that the first sensor continuously detects an operation of the user includes: the processor determines whether duration of a press or touch operation performed by the user on the fingerprint sensor is greater than first threshold duration; and if the duration is greater than the first threshold duration and the collected fingerprint matches the preset fingerprint, after determining that the user enters the first operation that meets the preset unlock condition, the processor detects that the user keeps operating the first sensor; or the processor determines whether duration during which the user operates the sensor after the user determines that the collected fingerprint matches the prestored fingerprint is greater than second threshold duration; and if the duration is greater than the second threshold duration, the processor determines that the user keeps operating the first sensor after entering the first operation that meets the preset unlock condition.

In a possible design method, the interactive device includes: a first sensor, configured to receive the first operation; and a second sensor, configured to receive a third operation entered by the user; and that the processor determines that the user does not stop operating the terminal after entering the first operation includes: the processor detects, by using the second sensor before determining that the first sensor receives the first operation that meets the preset unlock condition, that the user starts to enter the third operation and that duration during which the third operation exists after the first operation is greater than third threshold duration.

In a possible design method, the first sensor is a fingerprint sensor, the second sensor is a touch sensor, and that the processor detects, by using the second sensor before determining that the first sensor receives the first operation that meets the preset unlock condition, that the user starts to enter the third operation is specifically: before detecting, by using the fingerprint sensor, a fingerprint that matches a preset fingerprint, the processor detects a touch operation that is entered by the user by using the touch sensor; and that the processor determines that duration during which the third operation exists after the first operation is greater than third threshold duration is specifically: after detecting, by using the fingerprint sensor, the fingerprint that matches the preset fingerprint, the processor detects that duration of the touch operation that is entered by the user by using the touch sensor exceeds the third threshold duration.

In a possible design method, one or more shortcuts are displayed in the third user interface, and each of the one or more shortcuts corresponds to one function in the terminal; and that the processor controls the terminal to execute a function corresponding to the second operation is specifically: the processor determines that the second operation is used to trigger a first shortcut in the one or more shortcuts; and the processor controls the terminal to execute a function corresponding to the first shortcut.

In a possible design method, that a display device displays a third user interface includes: if a touchscreen of the terminal detects a touch operation of the user when the processor determines that the first operation meets the preset unlock condition and that the user does not stop operating the terminal after entering the first operation, the display device displays the one or more shortcuts in the third interface based on a touch point of the touch operation of the user on the touchscreen.

In a possible design method, the second operation is a first gesture operation entered by the user, and that the processor controls the terminal to execute a function corresponding to the second operation is specifically: the processor determines, based on a preset correspondence between a gesture and a function of the terminal, a first function corresponding to the first gesture entered by the user; and the processor controls the terminal to execute the first function.

In a possible design method, mapping information is displayed in the third user interface, and the mapping information is used to indicate a gesture corresponding to one or more functions.

In a possible design method, the processor is further configured to: before controlling the terminal to execute the function corresponding to the second operation, determine that the interactive device continuously detects, within a time period from time at which the first operation is detected to time at which the second operation is detected, an input operation performed by the user on the terminal.

In a possible design method, the first sensor is a fingerprint sensor, the second sensor is a touch sensor, and both the second operation and the third operation are entered by using the touch sensor.

In a possible design method, the processor is further configured to: before controlling the terminal to execute the function corresponding to the second operation, determine that the user continuously performs an input operation during the third operation and the second operation by using the touch sensor.

In a possible design method, the display device is a touchscreen integrating a screen of the terminal and a touch sensor, the interactive device is an in-screen fingerprint sensor configured to detect a fingerprint entered by the user in a screen display area, and the first operation is an operation that the user touches or presses the screen display area with a finger to enter a fingerprint; that the processor determines that the first operation meets the preset unlock condition is specifically: the processor determines that a fingerprint entered by the user by using the in-screen fingerprint sensor matches a preset fingerprint; the interactive device further includes a touchscreen, configured to detect a touch operation of the user; and that the processor determines that the user does not stop operating the terminal after entering the first operation is specifically: the processor determines that the user still keeps touching the touchscreen with a finger after entering the matched fingerprint, where the second operation is an operation entered by the user when the user keeps touching the screen with the finger after entering the first operation.

According to a third aspect, an embodiment of this application provides a computer-readable storage medium. The computer-readable storage medium stores an instruction. When running on a terminal, the instruction enables the terminal to perform the interface display method according to the first aspect.

According to a fourth aspect, an embodiment of this application provides a computer program product including an instruction. When running on a terminal, the computer program product enables the terminal to perform the interface display method according to the first aspect.

DESCRIPTION OF EMBODIMENTS

In this specification, the expressions "first" and "second" are merely intended for a purpose of reference, and shall not mean an indication or implication of relative importance or implicit indication of a quantity of indicated technical features. Therefore, a feature limited by "first" or "second" may explicitly or implicitly include one or more features. In the description of the embodiments of this application, unless otherwise stated, "plurality of" means two or more than two.

The following describes the technical solutions in the embodiments of this application with reference to the accompanying drawings in the embodiments of this application.

In the interface display method of a terminal provided in the embodiments of the present invention, after a terminal determines that a user performs an operation for unlocking the terminal, if the user does not stop operating the terminal, for example, the user does not immediately lift a finger after performing fingerprint unlocking, the terminal provides a quick entry of a function of the terminal for the user. The terminal can use a coherent operation without interruption to both unlock the terminal and execute a function of the terminal (for example, open an application of the terminal), thereby improving operation efficiency and achieving good user experience.

In this specification, executing a function of the terminal includes: opening an application, opening a file, opening a folder, or opening an application and executing a function of the application by using the opened application, for example, opening a "Camera" application for photographing, opening a "Recorder" application and performing recording, opening a "Music" application for playing music, opening a "Weather" application for displaying weather, opening "Notepad" and creating a new note, opening a "Phone" application for calling a preset contact, opening a "Messaging"/"WeChat" application and opening a message editor for sending an SMS message/WeChat message to a preset contact, opening a "Map" application and navigating to a preset location, opening a "Browser" application and opening a preset web page. Certainly, executing a function of the terminal may alternatively be executing a system function, for example, switching a displayed page, changing a display/scenario/power saving mode, or switching a system to a normal/game mode.

Figure 5:
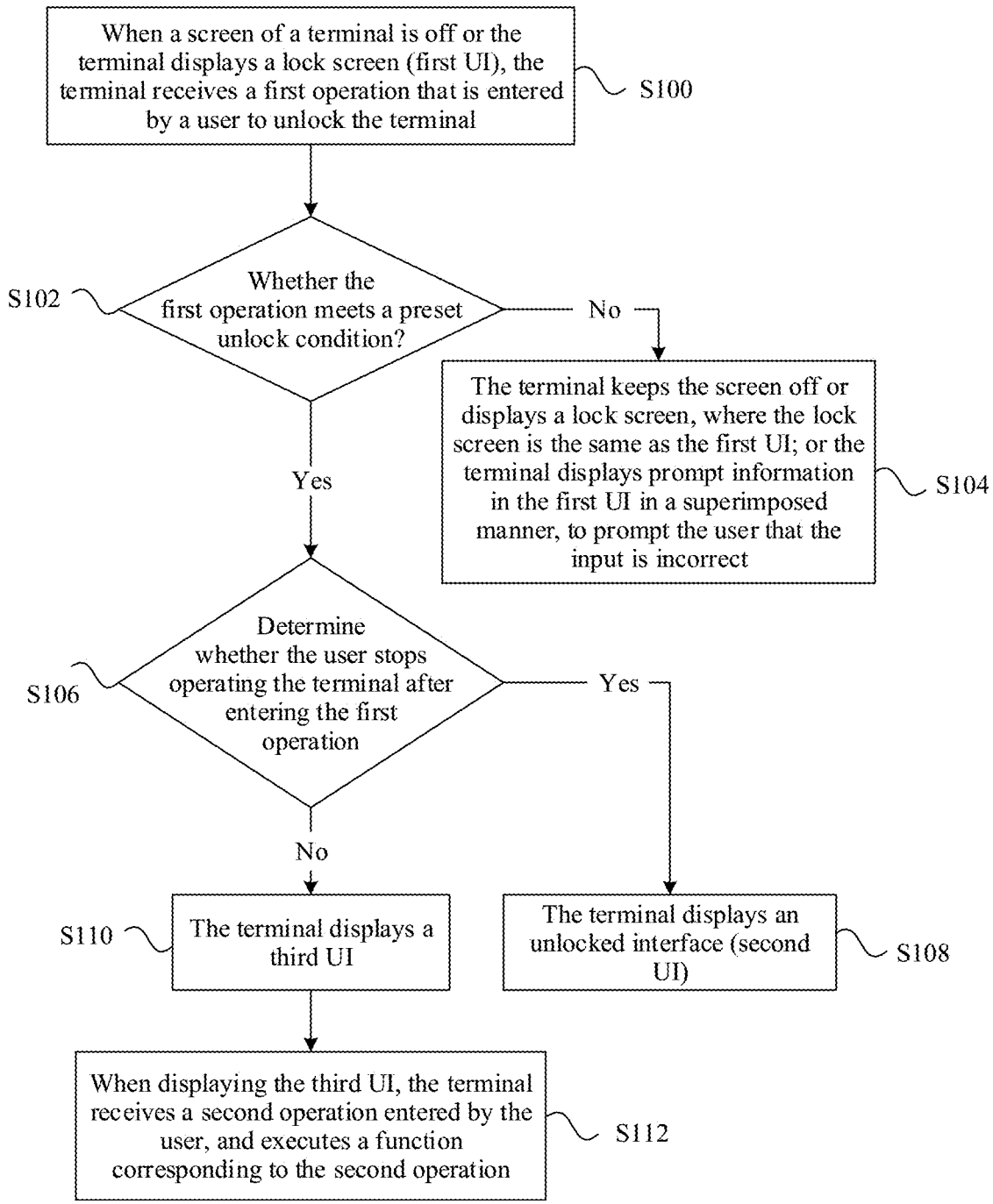
FIG. 5 is a schematic flowchart of a user interface display method of a terminal according to an embodiment of the present invention.

As shown in FIG. 5, a user interface display method of a terminal in an embodiment of the present invention includes:

Step S100: When a screen of a terminal is off or the terminal displays a lock screen, the terminal receives a first operation that is entered by a user to unlock the terminal.

In an embodiment of the present invention, when the screen of the terminal is off, or in the lock screen (herein referred to as a first user interface) of the terminal, the user unlocks an operating system of the terminal by using the first operation. To prevent a misoperation or protect user privacy and data security, the user usually sets a lock manner and an unlock manner of the terminal. For example, the terminal may be set to be locked when the screen of the terminal is off. When the screen is lit up again, the terminal is in a lock screen state, and the user cannot enter an interface other than the lock screen and therefore cannot use a complete function of the terminal. In this case, the terminal needs to be unlocked in the preset unlock manner, to enable the terminal to skip the lock screen, so that a complete function of the terminal within rights of the user can be used.

For example, when the screen of the terminal is off, the user may press or touch a fingerprint sensor with a finger to light up the screen of the terminal and unlock the terminal. In this case, the terminal may light up the screen and unlock the terminal when the fingerprint sensor collects a fingerprint that matches a preset fingerprint; or the terminal may light up the screen when detecting that the fingerprint sensor is touched, and unlock the terminal when collecting the fingerprint that matches the preset fingerprint. Alternatively, the user may press or touch the fingerprint sensor with the finger in the lock screen of the terminal to unlock the terminal. In this case, the terminal may unlock the terminal when the fingerprint sensor collects the matched fingerprint.

In this embodiment of the present invention, the fingerprint sensor may be an out-screen fingerprint sensor (for example, a fingerprint sensor disposed on a HOME button, or a rear-facing fingerprint sensor disposed on the back of the terminal) that collects a fingerprint outside a screen area, or may be an in-screen fingerprint sensor that collects a fingerprint in the screen area, for example, a fingerprint sensor disposed on the bottom of the screen, a fingerprint sensor integrated with the touchscreen, or a sensor that is disposed on an upper/lower side or a left/right side of the screen to collect a fingerprint in the screen area. When being disposed on the bottom of the screen, a location and a size of the fingerprint sensor are usually fixed. When a fingerprint of the user needs to be collected, an icon (for example, an icon of a fingerprint shape) is usually displayed in an area corresponding to the fingerprint sensor in the screen.

Certainly, the user may alternatively implement an unlock function by using input of another sensor. For example, the user may alternatively enter the first operation by using the following sensors:

1. A touch operation of the user is identified by using a touch sensor (which may also be referred to as a touch-sensitive sensor, for example, a touchscreen or a touchpad) for unlocking, for example, sliding to unlock or pattern unlocking.

2. An iris input operation of the user is identified by using an iris sensor, where the terminal unlocks the terminal when identifying an iris that matches a preset iris.

3. A face image input operation of the user is identified by using an image sensor, where the terminal unlocks the terminal when identifying a face image that matches a preset face.

Certainly, the user may alternatively enter the first operation by using another sensor of the terminal. The used sensor is not limited in the present invention.

Step S102: The terminal determines whether the first operation entered by the user meets a preset unlock condition. If the first operation meets the preset unlock condition, the terminal performs step S106; otherwise, the terminal performs step S104.

Corresponding to the plurality of implementations of the first operation in step S100, that the first operation meets the preset unlock condition of the terminal may include:

1. The preset unlock condition is detecting a sliding operation, and the first operation entered by the user is a sliding operation on the screen.

2. The preset unlock condition is detecting unlock pattern input, and the first operation entered by the user is drawing a preset unlock pattern on the screen.

3. The preset unlock condition is detecting a fingerprint that matches a preset fingerprint, and the first operation entered by the user is pressing a fingerprint sensor with a corresponding finger; in other words, entering a matched fingerprint by using the fingerprint sensor.

4. The preset unlock condition is detecting an iris that matches a preset iris, and the first operation entered by the user is an operation of entering an iris by using an iris sensor.

5. The preset unlock condition is detecting a face image that matches a preset face, and the first operation entered by the user is an operation of entering a face image by using a face sensor. The face sensor includes a camera, a structured light sensor, and the like, and is not limited in the present invention.

Step S104: The terminal keeps the screen off or displays a lock screen.

When the first operation entered by the user is inconsistent with the preset unlock condition, if the terminal is in a screen-off state before the first operation is entered, the terminal may keep the screen off or display a lock screen; or if the terminal is in a screen-on state and displays a lock screen before the first operation is entered, the terminal still displays a lock screen. The lock screen may be consistent with the first interface, or may be inconsistent with the first interface. For example, the lock screen may display prompt information in the first interface in a superposed manner, to prompt the user that the input is incorrect and the unlocking fails.

Step 106: Determine whether the user stops operating the terminal after entering the first operation, and if yes, perform step S108; otherwise, perform step S110.

In an embodiment of the present invention, the user performs the first operation by using a first sensor, and the user still keeps operating the first sensor after the terminal is unlocked. In this case, the terminal determines that the user does not stop operating the terminal after entering the first operation by using the first sensor.

The following provides description by using an example in which the first sensor may be a fingerprint sensor. The first sensor may be another sensor that can detect user input, and is not limited in the present invention.

If the user keeps pressing or touching the fingerprint sensor with a finger after unlocking the terminal by pressing or touching the fingerprint sensor, the user does not stop operating the terminal. In this case, the terminal may determine, in at least the following two manners, whether the user keeps operating the fingerprint sensor after the terminal is unlocked:

Manner 1: The terminal determines whether duration of a press or touch operation performed by the user on the fingerprint sensor is greater than first threshold duration. If the duration is greater than the first threshold duration and a collected fingerprint matches a preset fingerprint, the terminal determines that after entering the first operation, the user keeps operating the sensor; in other words, the user does not stop operating the terminal. In this case, the terminal performs step S110. If the duration is less than the first threshold duration, the terminal determines that the user stops operating the terminal after the user unlocks the terminal. In this case, the terminal performs step S108.

Manner 2: The terminal determines whether duration during which the user operates the sensor after the user determines that a collected fingerprint matches a prestored fingerprint is greater than second threshold duration. If the duration is greater than the second threshold duration, the terminal determines that after entering the first operation, the user keeps operating the sensor; in other words, does not stop the input operation on the terminal. In this case, the terminal performs step S110. If the duration is less than the second threshold duration, the terminal determines that the user stops the input operation on the terminal after entering the first operation. In this case, the terminal performs step S108.

Certainly, the terminal may use another time point in a process in which the user continuously operates the sensor as a start point to count continuous operation time, and determine, based on counted duration, whether the user keeps operating the sensor after the terminal is unlocked. The manner is not limited in the present invention.

In another embodiment of the present invention, the user may perform the first operation by using a first sensor, and perform a third operation by using a second sensor. If the third operation starts before the terminal detects the first operation that meets the preset unlock condition, and duration during which the third operation exists after the terminal detects the first operation that meets the preset unlock condition is greater than third threshold duration, the user does not stop the input operation on the terminal after entering the first operation.

For example, the first sensor may be an iris sensor, and the second sensor may be a touch sensor.

When the terminal displays the first user interface, that the user enters the first operation may be that the user enters an iris of the user by using the iris sensor, for example, the terminal collects a human-eye iris by using a front-facing iris collection camera. Before the terminal determines that the iris entered by the user matches a preset iris, and unlocks the terminal, the terminal detects a touch operation (namely, the third operation, which may be, for example, an operation that the user touches the touchscreen of the terminal) of the user by using the touch sensor. In this case, the terminal determines whether duration during which the touch operation exists after the terminal determines that the iris entered by the user matches the preset iris is greater than the third threshold duration. If the duration is greater than the third threshold duration, the terminal determines that the user does not stop the input operation on the terminal after entering the first operation. In this case, the terminal performs step S110. If the duration is less than the third threshold duration, the terminal determines that the user stops the input operation on the terminal after entering the first operation. In this case, the terminal performs step S108.

In another implementation, the first sensor may be an in-screen fingerprint sensor that collects a fingerprint in a screen area, for example, a fingerprint sensor disposed on the bottom of the screen, a fingerprint sensor integrated inside the touchscreen, or a sensor that is disposed on an upper/lower side or a left/right side of the screen to collect a fingerprint in the screen area. The second sensor may be a touch sensor.

When the terminal displays the first user interface, that the user enters the first operation may be that the user presses or touches the screen with a finger to enter a fingerprint. After collecting the matched fingerprint by using the fingerprint sensor, the terminal determines, by using the touch sensor (the touchscreen in this example), whether the user still keeps touching the touch sensor within third preset duration; in other words, determines whether the finger is not lifted. If the finger is not lifted, the terminal performs step S110. If the finger is lifted, the terminal performs step S108.

It may be learned by a person skilled in the art based on the foregoing examples that specific forms of the first sensor and the second sensor are not limited in the present invention, provided that the first sensor can collect the first operation performed by the user for unlocking, the second sensor can be configured to collect the third operation, and the terminal can determine, based on signals collected by the first sensor and the second sensor, whether the user still performs the input operation on the terminal during preset duration (for example, the third threshold duration) after entering the first operation.

Step S108: The terminal displays a second user interface, where the second user interface is an unlocked user interface, referred to as an unlocked interface. After entering the unlocked interface, the user can use the complete function of the terminal without any further unlock operation.

Figure 3A:
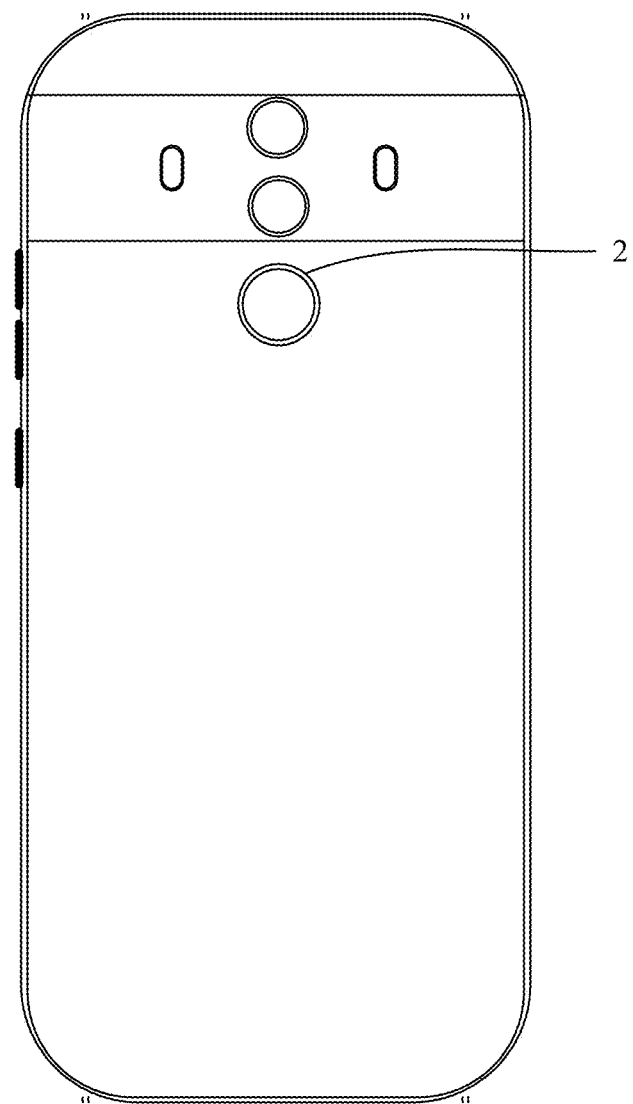
FIG. 3A is a schematic diagram of a rear-facing fingerprint setting location of a terminal in the prior art.
Figure 3B:
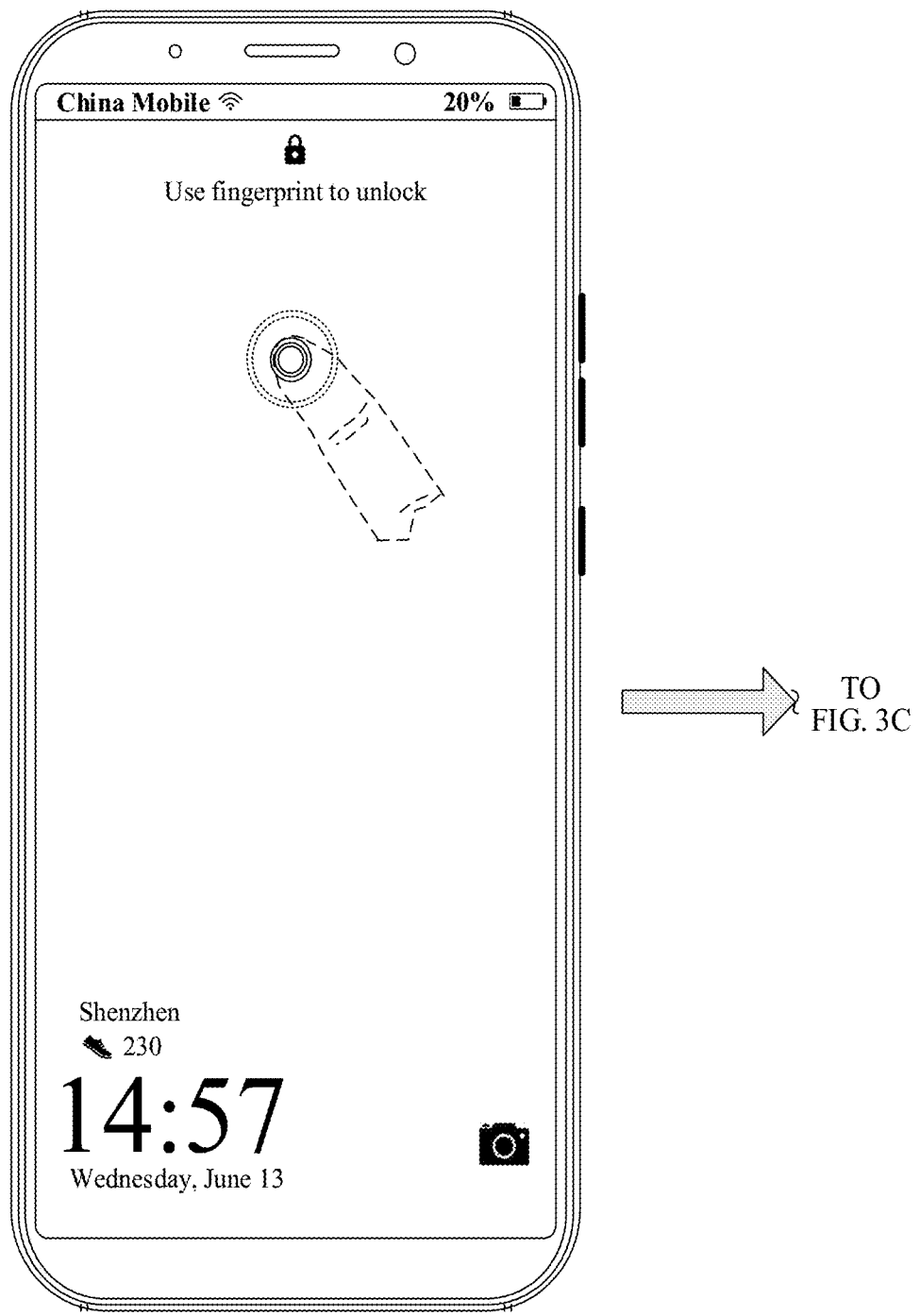
FIG. 3B is a schematic diagram of unlocking a terminal by using a rear-facing fingerprint in the prior art.
Figure 3C:
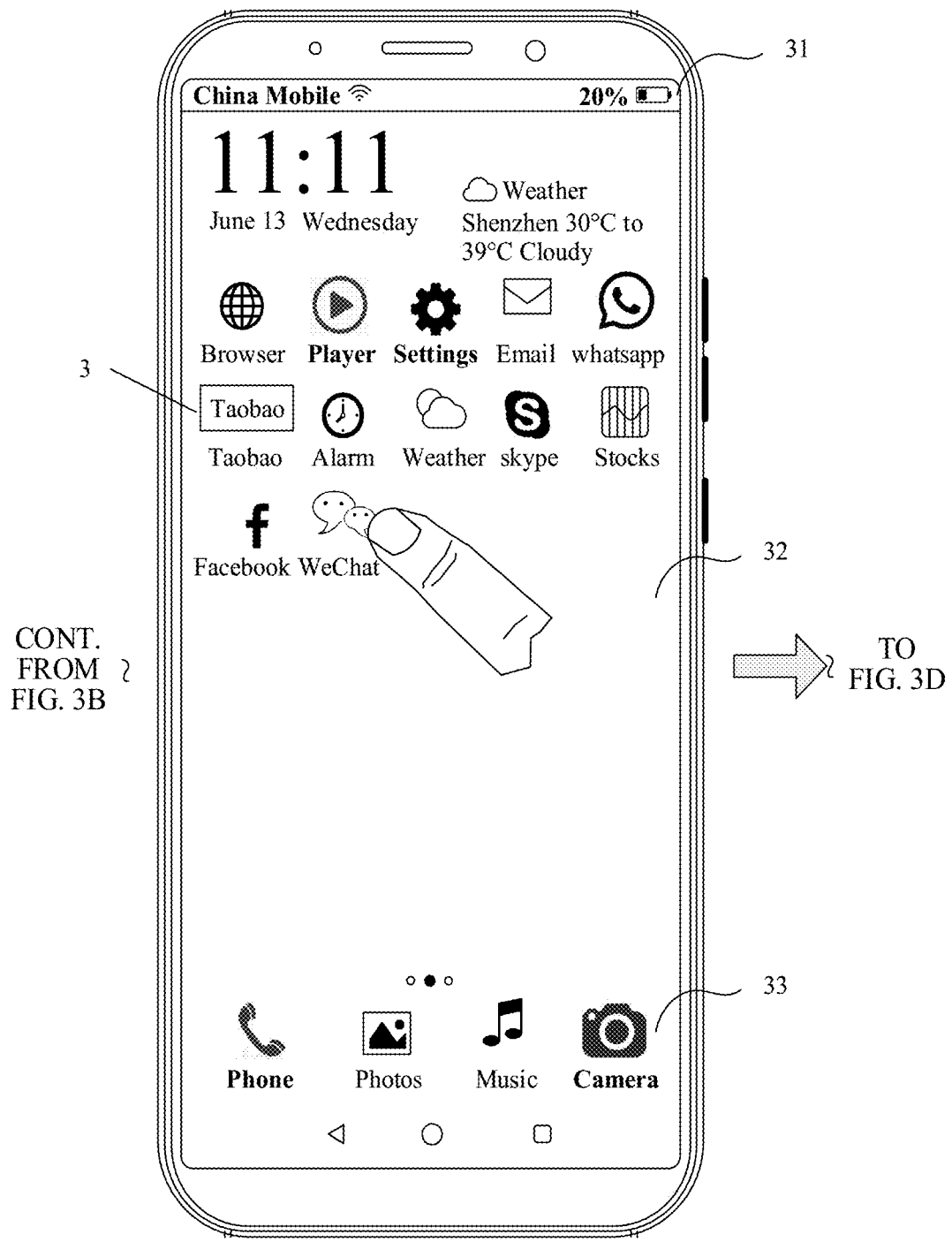
FIG. 3C is a schematic diagram of opening an application after a terminal is unlocked in the prior art.
Figure 3D:
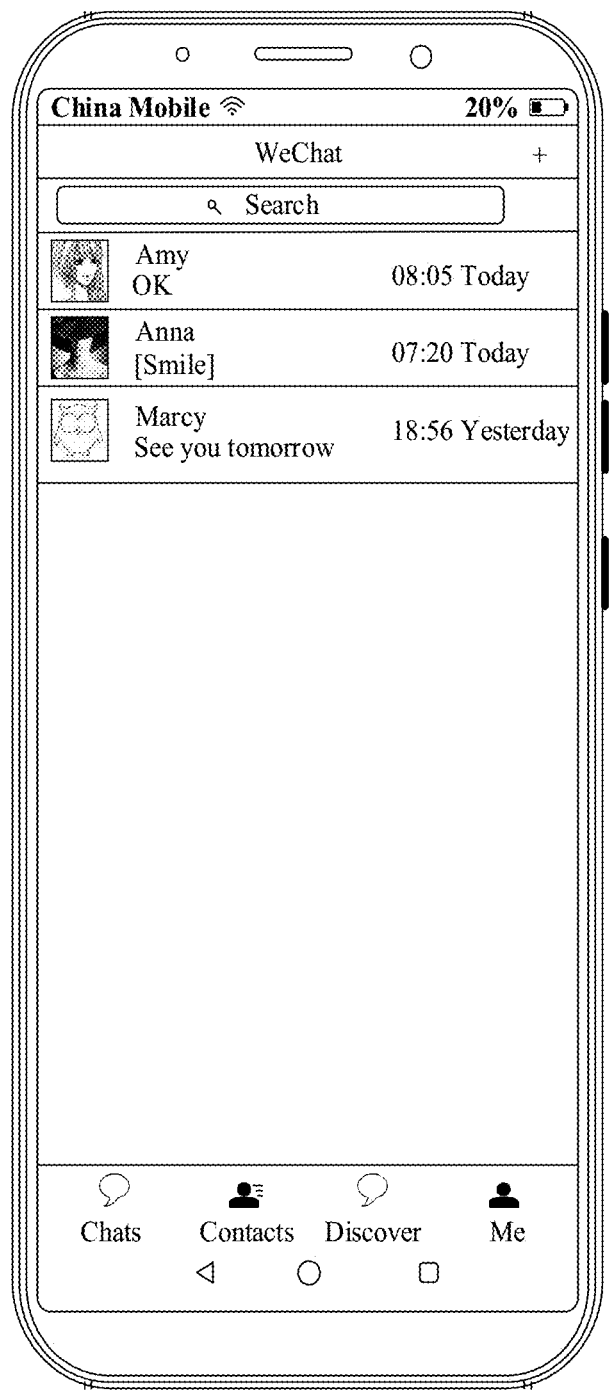
FIG. 3D is a schematic diagram of an interface displayed after an application is opened in the prior art.
Figure 4A:
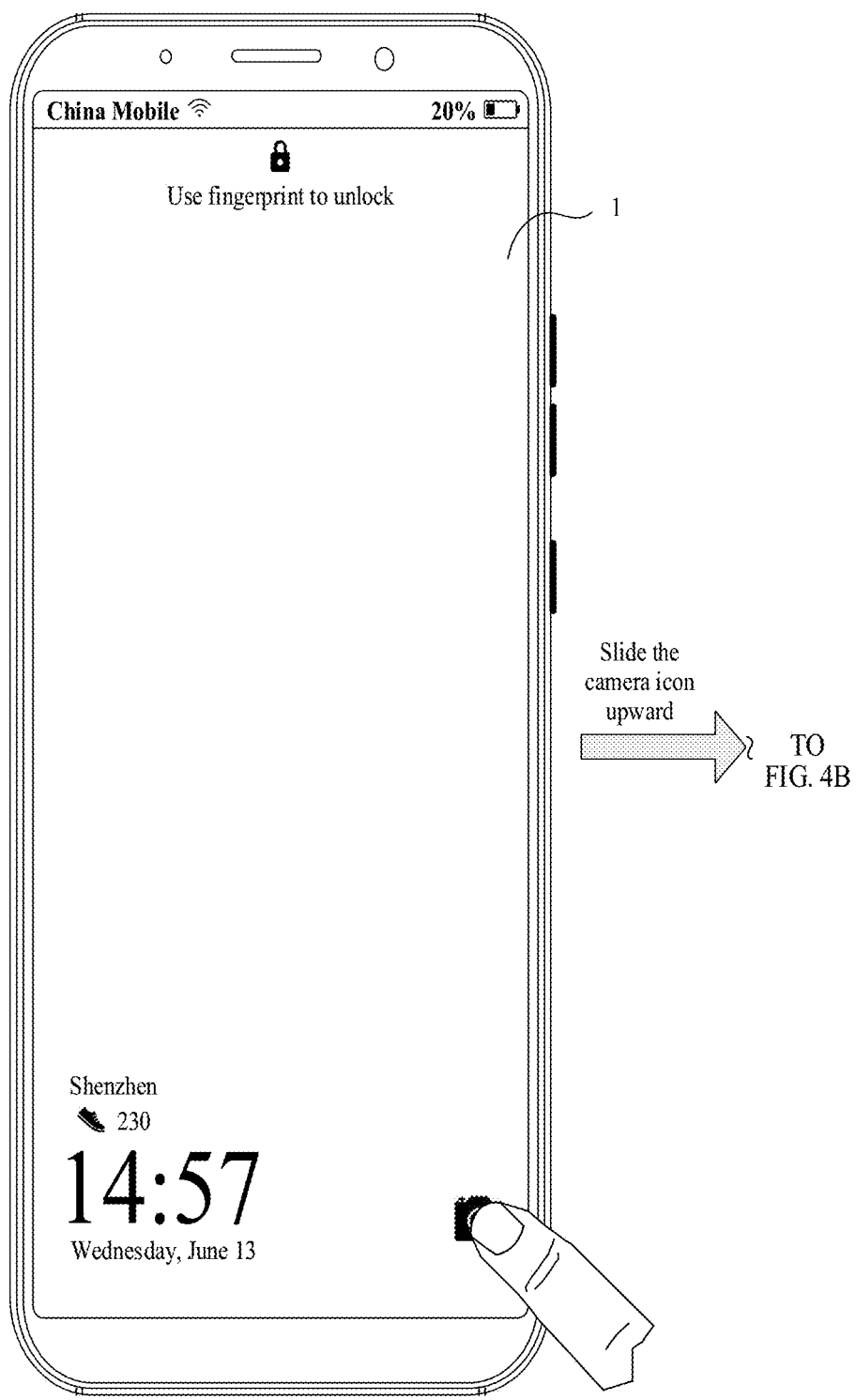
FIG. 4A, FIG. 4B, and FIG. 4C are a schematic diagram of a process in which a user operates a terminal to open an application in the prior art.
Figure 4B:
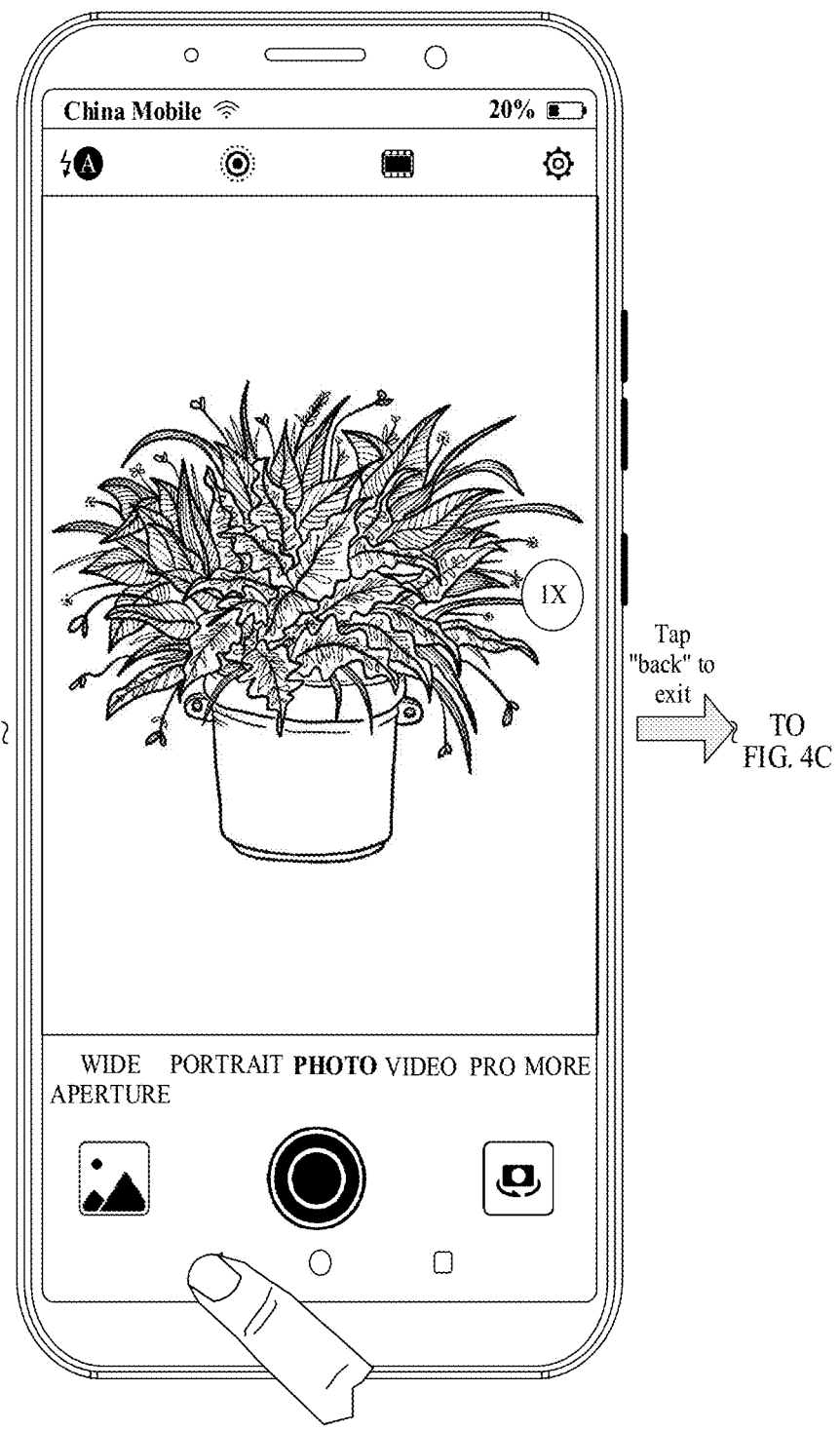
Figure 4C:
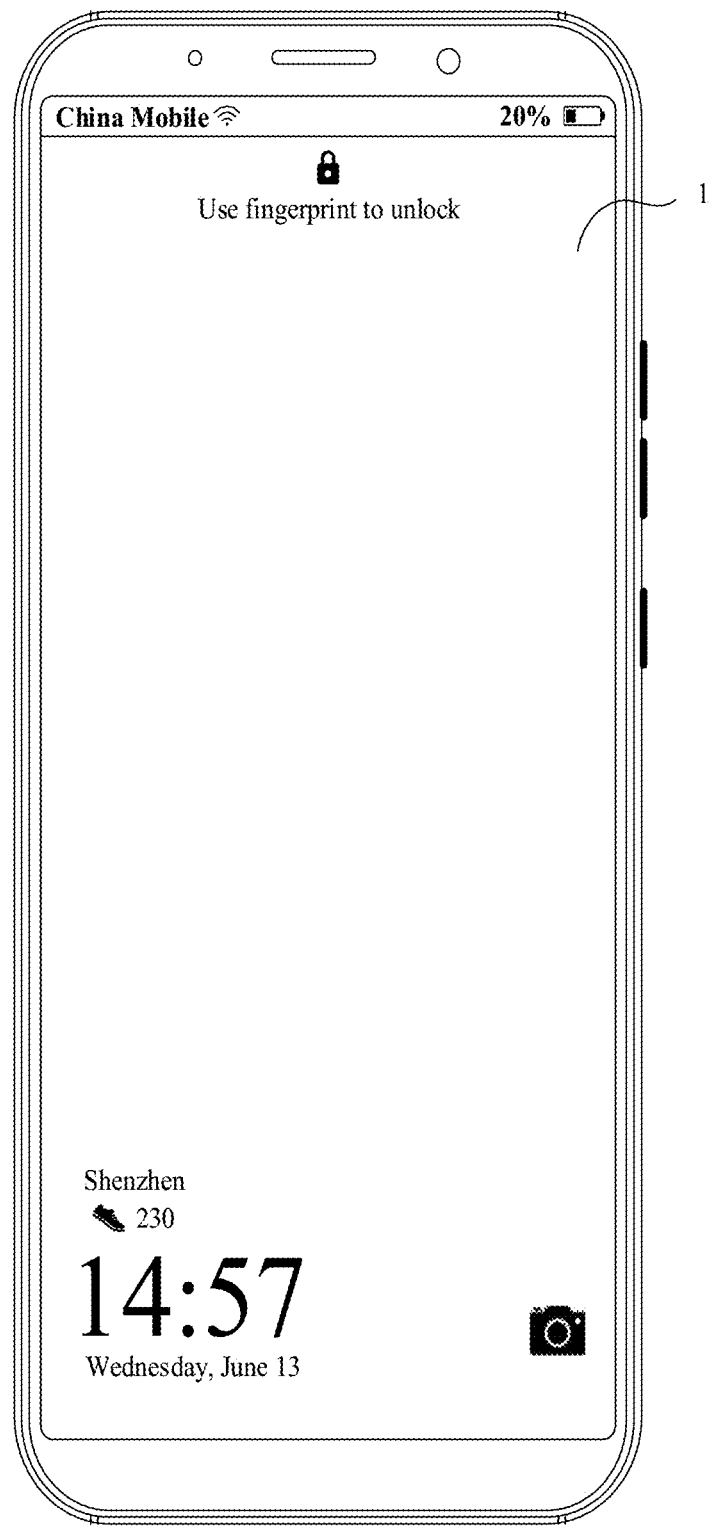

If the user stops operating the terminal (for example, the finger leaves the fingerprint sensor or the touchscreen) after unlocking the terminal by using the first operation, the terminal displays the second user interface. The second UI is the same as an interface displayed after the user unlocks the terminal in a conventional technical solution. For example, as shown in FIG. 3C, the second user interface may be a home screen 3 of an operating system that is displayed after the terminal is powered on. For example, the home screen 3 of the terminal may include a status bar 31, a page 32, and a resident bar (also referred to as a "Dock bar") 33. The page 32 is used to display an APP icon, a widget (widget), a file icon, a folder icon, or another shortcut used to trigger execution of a function of the terminal. The resident bar 33 is used to display an icon of an application or a function commonly used by the user, for example, an icon of an APP such as "Contacts", "Phone Book", or "Camera". Generally, the status bar 31, the page 32, and the resident bar 33 are respectively listed in upper, middle, and lower parts of the user interface. There may be a plurality of pages, and the displayed page 32 may be switched by using an operation of the user. In a page switching process, the status bar 31 and the resident bar 33 do not switch.

The second UI may alternatively be a user interface that is displayed by the terminal this time after unlocking and that is displayed when the terminal is locked last time. For example, the terminal opens a "Gallery" application, and browses a picture A by using the application. In this case, the user makes the screen off by using a power button, the terminal is locked, and the interface displayed by the terminal when the user unlocks the terminal again is an interface for browsing the picture A by using "Gallery".

The foregoing description shows an instance of the second user interface, and the second user interface may alternatively include another form of interface.

Step S110: The terminal displays a third UI. The third UI provides a quick entry of a function of the terminal.

If the user does not stop operating the terminal after entering the first operation used to unlock the terminal, the terminal displays the third UI.

In other words, if the terminal detects, when receiving the first operation (the first operation meets the preset unlock condition of the terminal) entered by the user, that the user does not stop operating the terminal, the terminal displays the third UI.

Figure 6A:
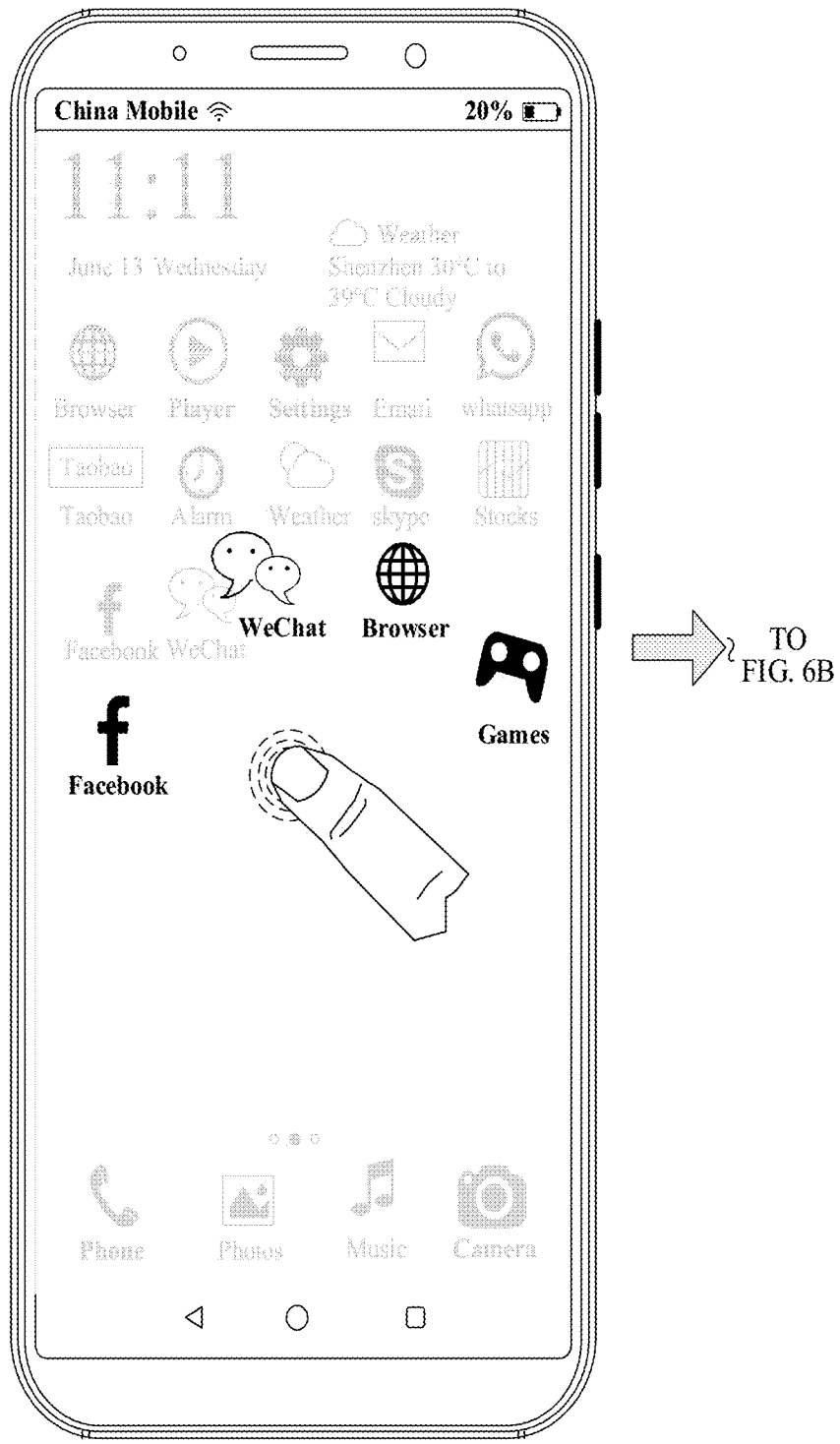
FIG. 6A is a schematic interface diagram 1 of a shortcut interface (third UI) of a terminal according to an embodiment of the present invention.

As shown in FIG. 6A, the second UI may be used as a background of the third UI, and content (which may also be referred to as an interface element) of the third UI is displayed at the second UI layer in a superposed manner. Proper transparent or blurring processing may be performed at the two-layer interface to achieve a relatively good UI effect. In addition, after the third UI is entered, content of the second UI is still displayed, but only a gesture defined for the third UI rather than a gesture operation defined for the second UI is responded. In other words, when the third UI is displayed, a user input operation detected by the terminal acts only on the third UI rather than the second UI. For example, in a display interface of the two-layer UI, if the user enters a user operation by using the touchscreen, the operation acts on an icon A in the third UI, and there is an icon A' in the second UI displayed in the lower layer in a blurring manner at coordinates of the icon A, the operation acts only on the icon A rather than the icon A'.

Certainly, when the third UI is presented, the second UI may not be used as a background of the third UI, but only content of the third UI is presented.

The third UI provides the quick entry of the function of the terminal in at least the following two manners:

Manner 1: The shortcut of the function of the terminal is provided in the third UI, and when the shortcut is triggered by an operation of the user, the function corresponding to the shortcut is executed.

Manner 2: A correspondence between a shortcut gesture and a function of the terminal is set in the third UI, and when a preset shortcut gesture is detected in the third UI, a function corresponding to the shortcut gesture is executed. The following separately describes the two manners.

Figure 7A:
FIG. 7A is a schematic interface diagram 2 of a shortcut access interface (third UI) of a terminal according to an embodiment of the present invention.
Figure 7B:
FIG. 7B is a schematic interface diagram 3 of a shortcut access interface (third UI) of a terminal according to an embodiment of the present invention.

In manner 1, as shown in FIG. 6A, FIG. 7A, and FIG. 7B, for content presented on the third UI, a shortcut may be displayed based on a finger press location. For example, the finger press location may be used as a center to distribute icons of a plurality of commonly used application programs or functions, or other shortcuts, and the terminal may set a distribution status of function shortcuts, such as a quantity of shortcuts, a distance between a shortcut and the finger press location, a shortcut arrangement order, and shortcut display transparency. Application programs may be distributed in a circular shape (including an elliptical shape and an irregular circular shape) around a finger touch location, may be distributed in a sector above or below a finger, or may be distributed in another form. This is not limited in this embodiment of the present invention.

The shortcuts mean that corresponding functions can be executed when the user triggers these shortcuts. The terminal may display these shortcuts in the UI, to prompt the user to trigger these shortcuts in a preset operation manner. When the terminal detects a preset operation, and determines a correspondence between a specific operation of the user and a displayed shortcut based on a layout of the shortcuts in the UI and the specific operation of the user, the terminal determines the shortcut corresponding to the specific operation, and then executes a corresponding function. For example, the shortcuts include icons and widgets on a page. When the user taps these icons or widgets, corresponding applications, files, or folders can be opened, or corresponding applications can be opened and functions of the applications can be executed.

Figure 7C:
FIG. 7C is a schematic interface diagram 4 of a shortcut access interface (third UI) of a terminal according to an embodiment of the present invention.
Figure 8A:
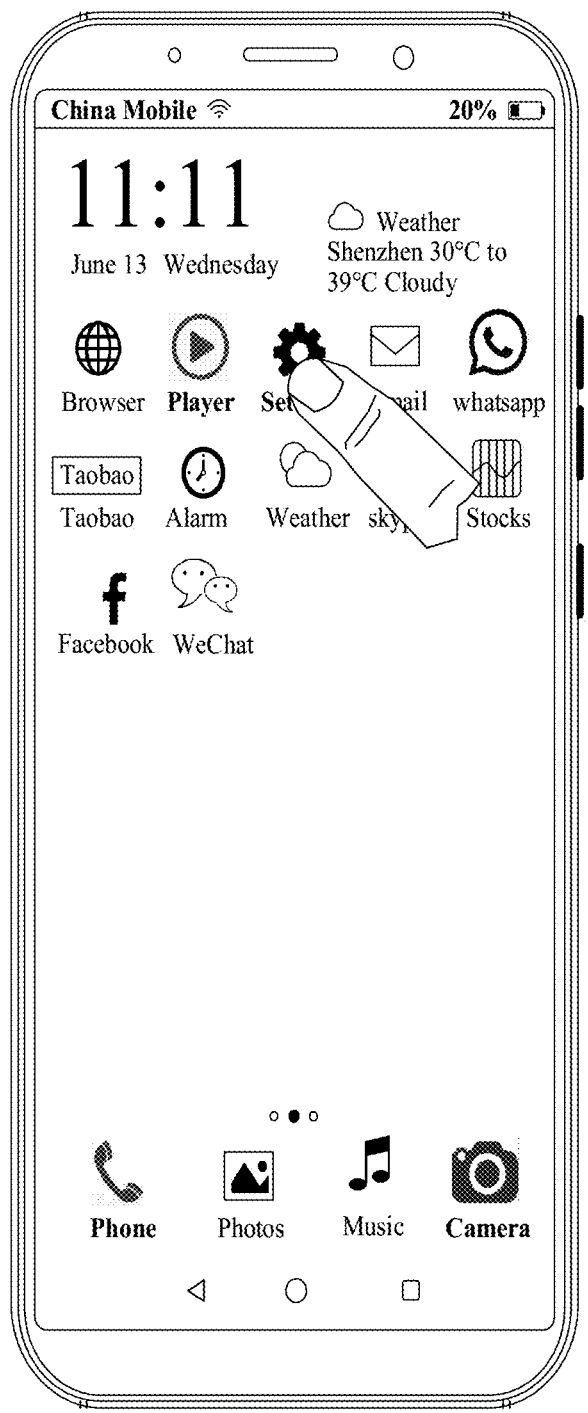
FIG. 8A, FIG. 8B, FIG. 8C, and FIG. 8D are a schematic diagram of a setting interface of a third UI of a terminal according to an embodiment of the present invention.
Figure 8B:
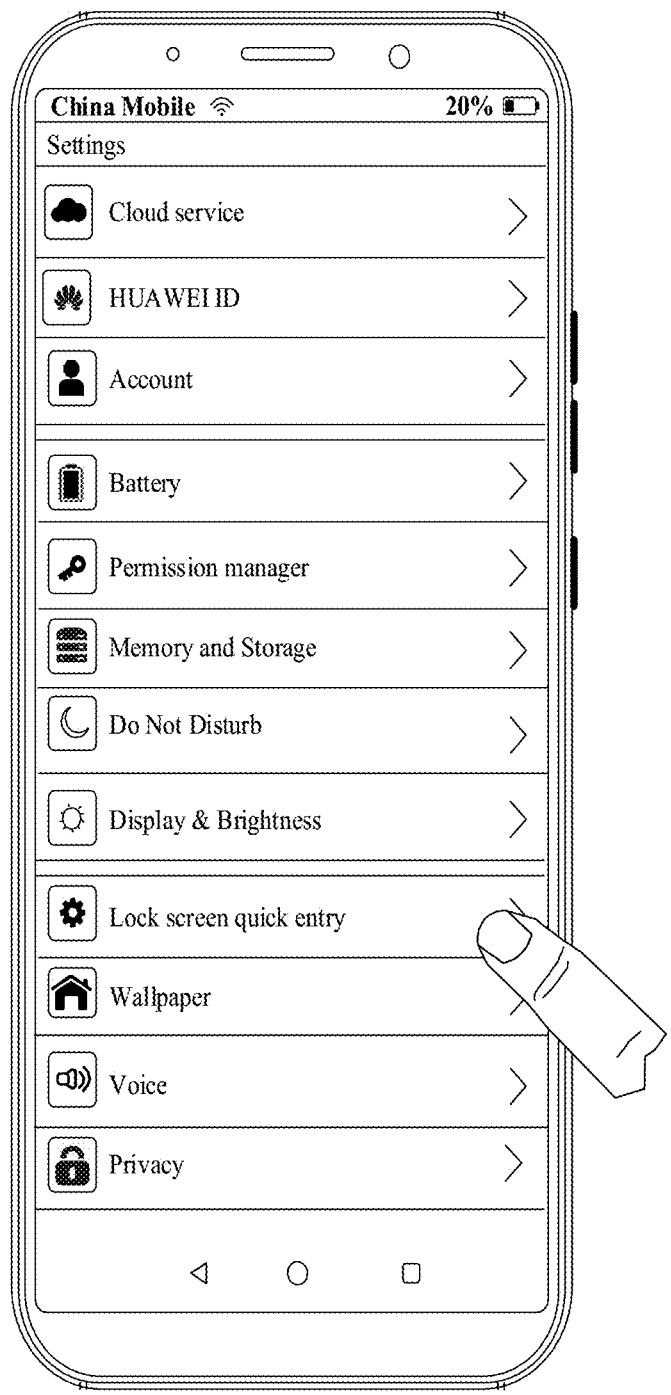
Figure 8C:
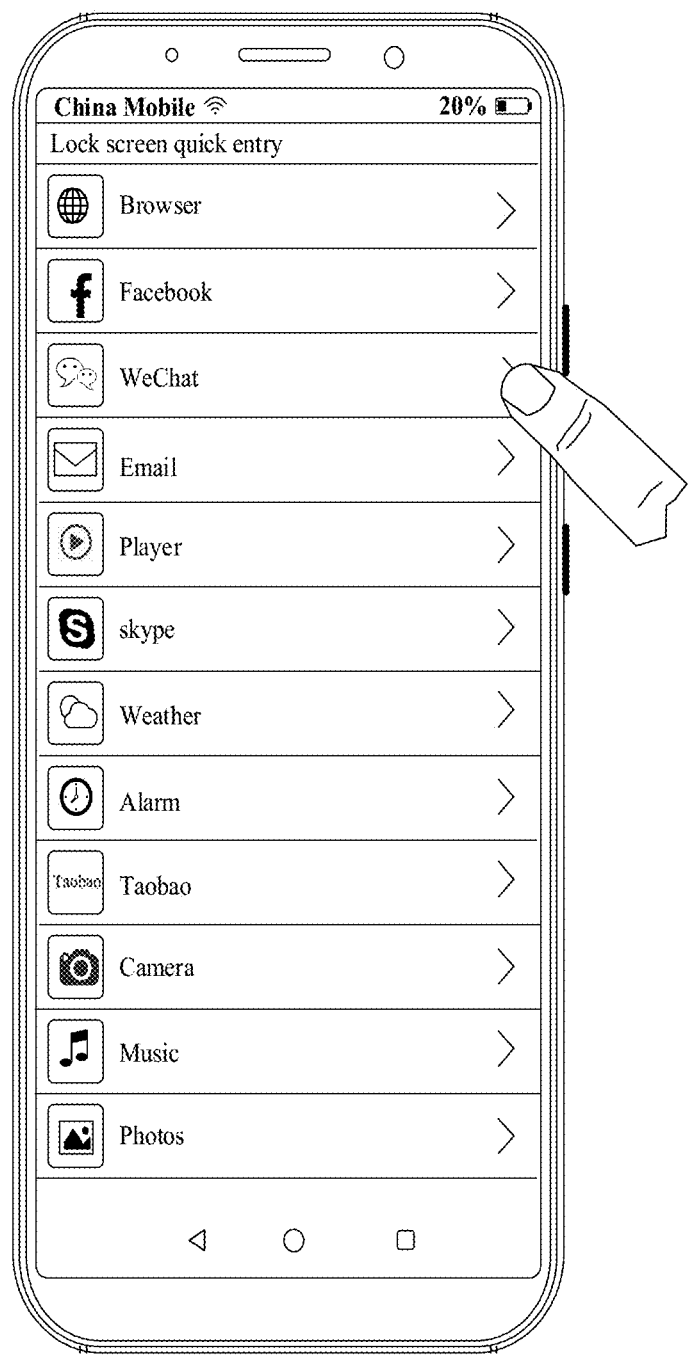
Figure 8D:
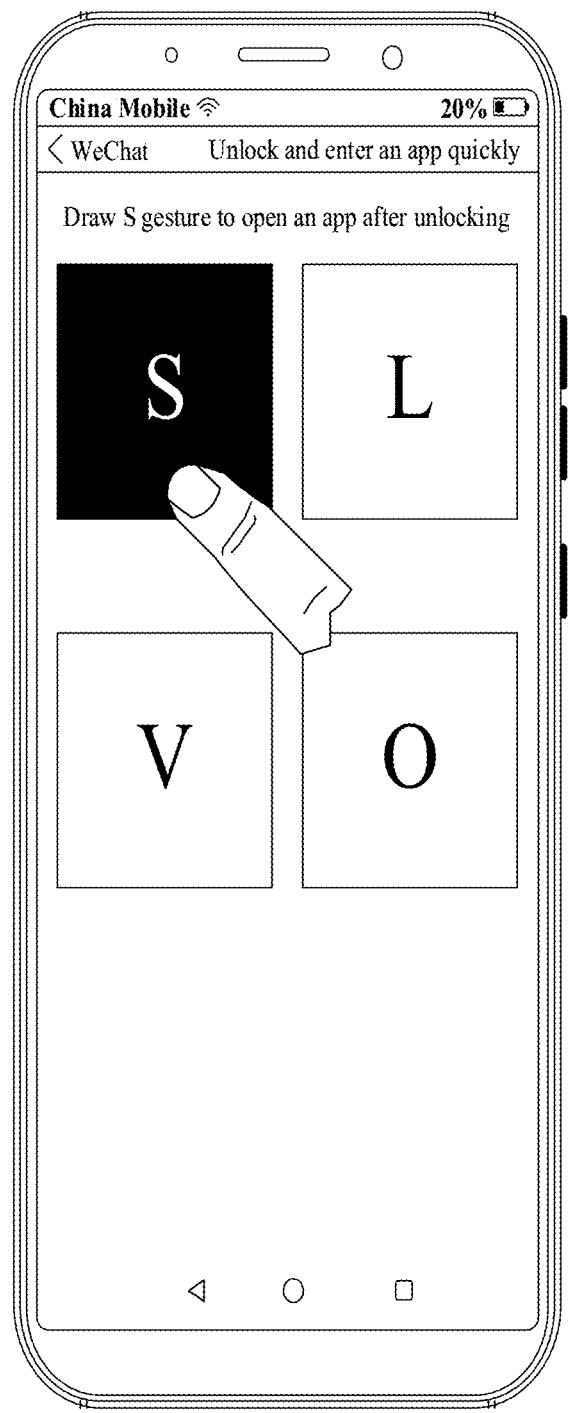

As shown in FIG. 7A to 7C, when a finger press location is located at or close to an edge location of the touchscreen, if shortcuts of application programs are arranged in a circular shape, some shortcuts may be displayed incompletely or may not be displayed at all. In this case, the terminal may adjust a display manner and a quantity of the shortcuts based on the finger press location, for example, the terminal may adjust the shortcuts to be presented in a sector or another form, to ensure that the shortcuts of the applications can be displayed completely.

The display manner of the shortcuts of the application programs in the third UI may include one of the following:

1. The shortcuts are arranged in a fixed order, and the shortcuts displayed in the third UI and an arrangement order of the shortcuts are customized by the user.

2. The terminal determines, based on frequency of using applications by the user, to display shortcuts of N applications with highest frequency in the third UI, and arrange the shortcuts in descending order of frequency.

3. The terminal determines, based on latest time of using applications by the user, to display, in the third UI, shortcuts of N applications that have been used by the user and whose use time is closest to display time of the third UI, and arrange the shortcuts in a time order.

4. The shortcuts are arranged in combinations, the user may customize shortcuts of X applications in manner 1, and the other unfixed N-X shortcuts are determined in manner 2 or manner 3. X and N are natural numbers, and X is less than N.

When the third UI provides the quick entry of the function of the terminal in manner 2, the correspondence between a shortcut gesture in the third UI and a function of the terminal is set in the terminal. For example, an "S"-shaped gesture pattern, a "C"-shaped gesture pattern, and an "O"-shaped gesture pattern respectively correspond to a "Calendar" application, a "disable all running applications" function, and a "play music" function. When the user enters an "S"-shaped gesture pattern, a "C"-shaped gesture pattern, or an "O"-shaped gesture pattern in the third UI, the terminal opens the "Calendar" application, disables all running applications, or plays music.

The user may set the correspondence between a gesture in the third UI and a function. The user may enter a setting interface of the third UI, select, from the setting interface, a function that needs to be executed in the third UI by using a shortcut, and enter a corresponding gesture in a gesture input area in the setting interface. The setting interface of the third UI may alternatively include two setting sub-interfaces, where a selection sub-interface is used to select a function (including an application) that needs to be displayed in the third UI, and a gesture sub-interface is used to set a gesture corresponding to a selected shortcut. As shown in FIG. 8A, FIG. 8B, FIG. 8C, and FIG. 8D, the setting interface of the third UI may alternatively provide only a preset gesture for the user to select, instead of recording a gesture entered by the user. The preset gesture may be represented by using a letter shape. For example, a letter C represents a "C"-shaped input gesture. When the user draws a "C" shape on the touchscreen with a finger in the third UI interface, the terminal performs similar recognition to a stroke count method on the gesture, to obtain a letter C, and then executes a function corresponding to the letter C based on a specified correspondence between the letter C and the function.

Figure 9A:
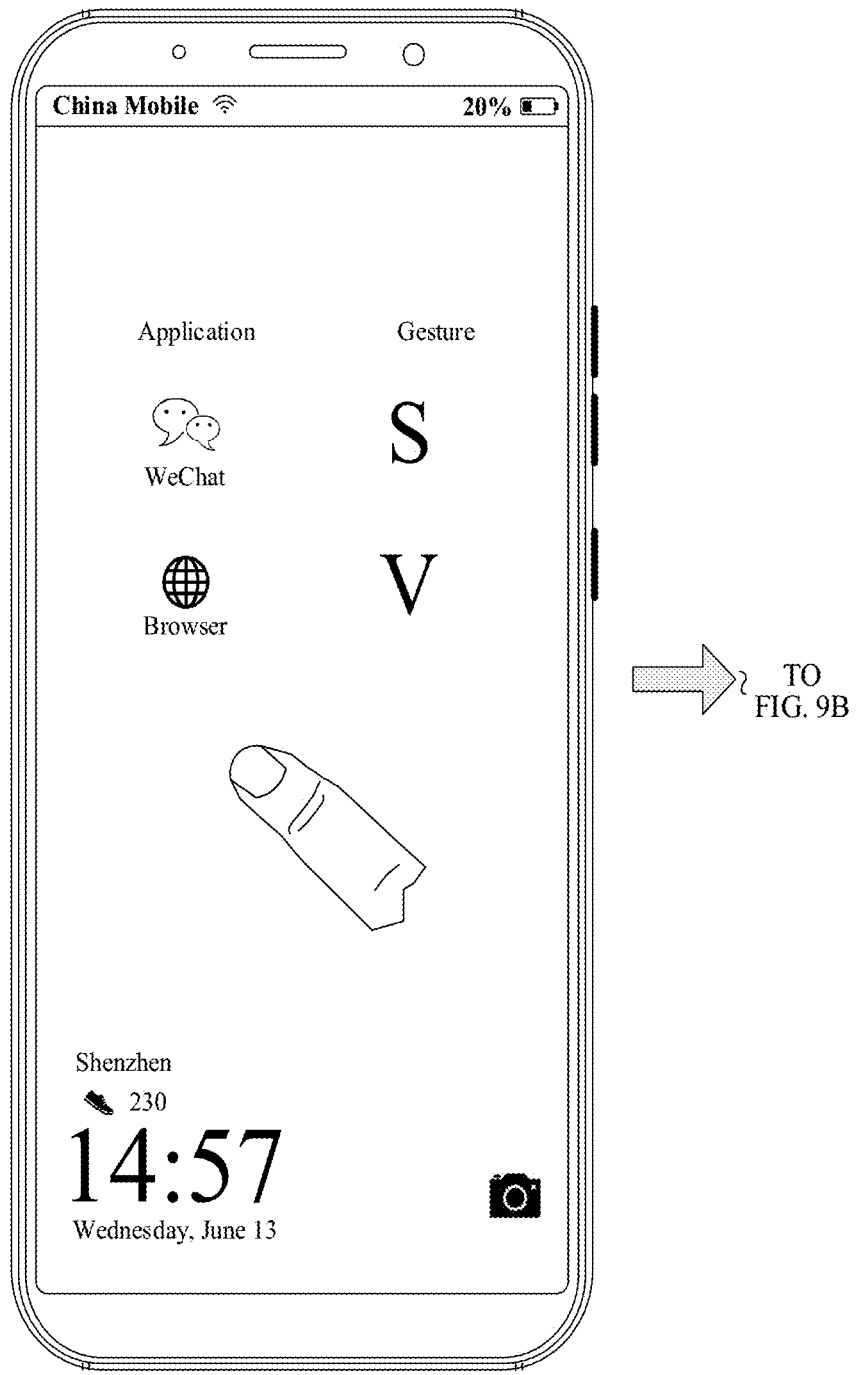
FIG. 9A is a schematic interface diagram 5 of a shortcut interface (third UI) of a terminal according to an embodiment of the present invention.

In manner 2, the third UI may display mapping information, where the mapping information is used to indicate a gesture corresponding to one or more functions. In other words, the third UI may display information about a correspondence between a gesture pattern set by the user and a function. For example, as shown in FIG. 9, an "S" gesture that is corresponding to a "WeChat" application and that is set by the user is displayed in parallel with the "WeChat" application.

Certainly, in manner 2, the third UI may not display the information about the correspondence between a gesture pattern set by the user and a function, and the user may know, based on memory or a setting of the user, a specific gesture to be entered in the third UI and a specific function that the gesture may trigger the terminal to execute.

Step S112: When displaying the third UI, the terminal receives a second operation entered by the user, and executes a function corresponding to the second operation.

In an embodiment of the present invention, when the terminal displays the third UI, the user enters the second operation to trigger the terminal to execute a preset function of the terminal. The user does not stop the input operation on the terminal from entering the first operation to entering the second operation. In other words, the terminal continuously detects, within a time period from time at which the first operation is detected to time at which the second operation is detected, the input operation performed by the user on the terminal.

In this embodiment, a process from entering, by the user, the first operation used for unlocking to executing a function of the terminal, for example, opening an application may be completed by using a coherent action used to enter the second operation, thereby improving operation efficiency and achieving good user experience.

In another embodiment of the present invention, the user may alternatively continue to enter the second operation after the user stops input to the terminal after the terminal displays the third UI.

The example in which the first sensor is an in-screen fingerprint sensor and the second sensor is a touchscreen is still used for description. The terminal detects, by using the fingerprint sensor, the first operation that is entered by the user to unlock the terminal, and when the terminal displays the third UI after the determining in steps S102 and S106, the touchscreen continues to detect the input operation of the user. When the touchscreen detects the preset second operation, the terminal executes the function corresponding to the preset second operation.

Figure 6B:
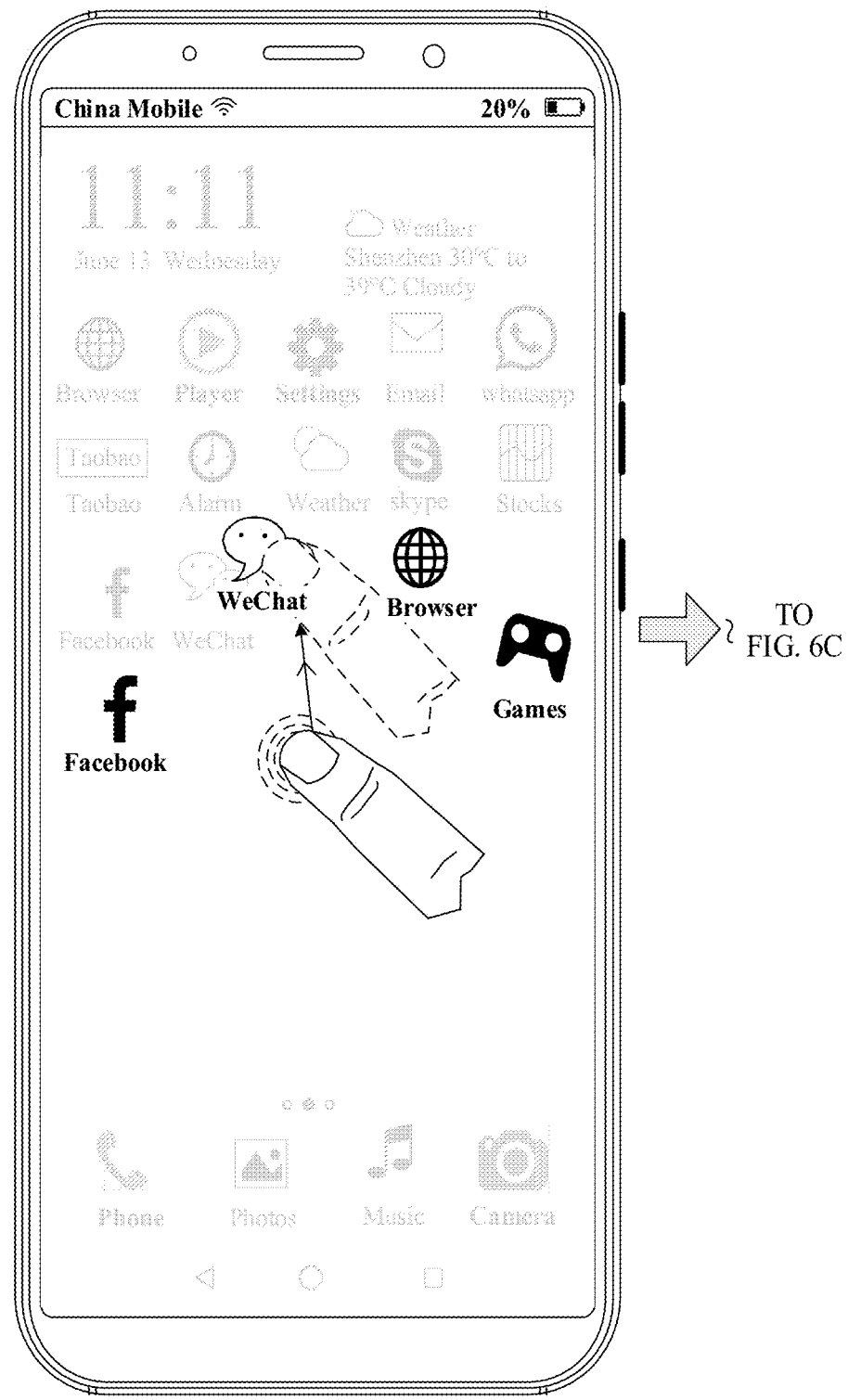
FIG. 6B is a schematic diagram 1 in which a user performs an operation in a third UI interface according to an embodiment of the present invention.
Figure 6C:
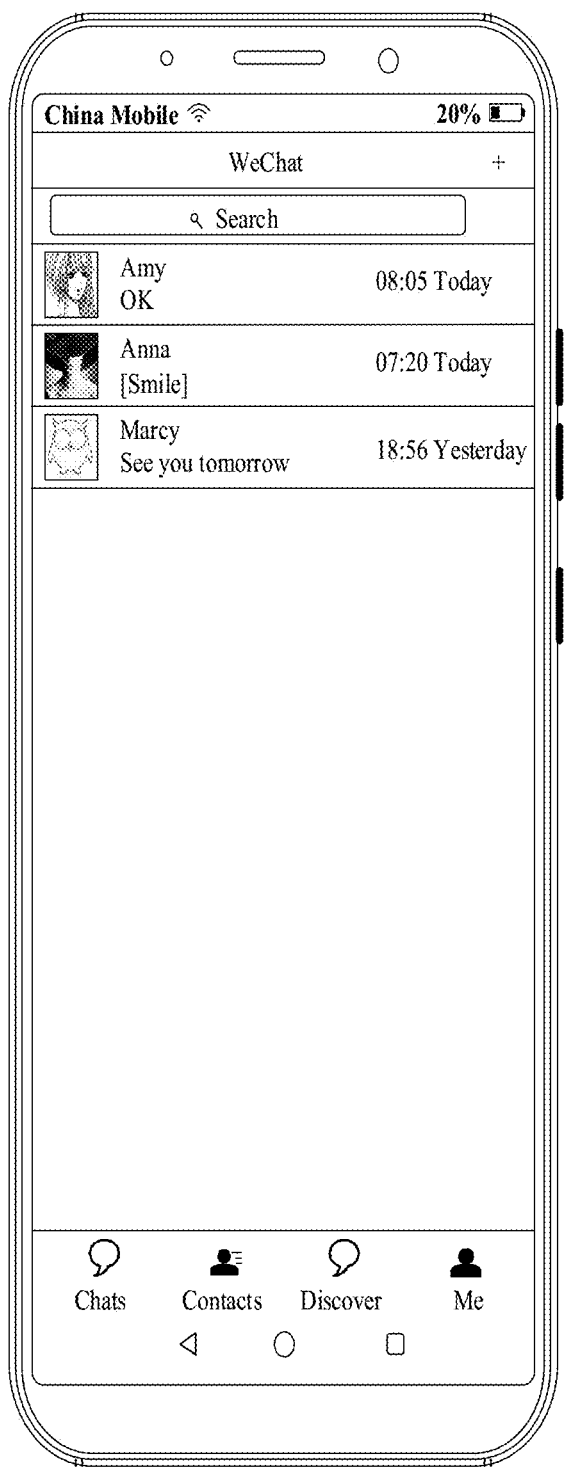
FIG. 6C shows an interface displayed by a terminal after an application is opened based on the operation shown in FIG. 6B according to an embodiment of the present invention.

An example is used to describe the second operation below with reference to the third UI in the foregoing embodiment. When the third UI provides the quick entry of the function of the terminal in manner 1, the second operation may be performed in any one of the following manners:

1. A finger slides by using a press or touch location on the touchscreen as a start point. When the finger moves to a shortcut in the third UI and the finger is lifted, the terminal opens an application corresponding to the shortcut. For example, as shown in FIG. 6A to 6C, when the user moves the finger to a "WeChat" icon and lifts the finger, the mobile phone opens a "WeChat" application.

2. A finger performs a flick (flick) operation toward a shortcut in the third UI by using a press or touch location on the touchscreen as a start point. The flick operation includes touch movement and accelerated movement, and is similar to an action that a person flicks dust from a desktop with fingers. The terminal determines a direction of the flick operation to determine a shortcut triggered by the operation.

Figure 10A:
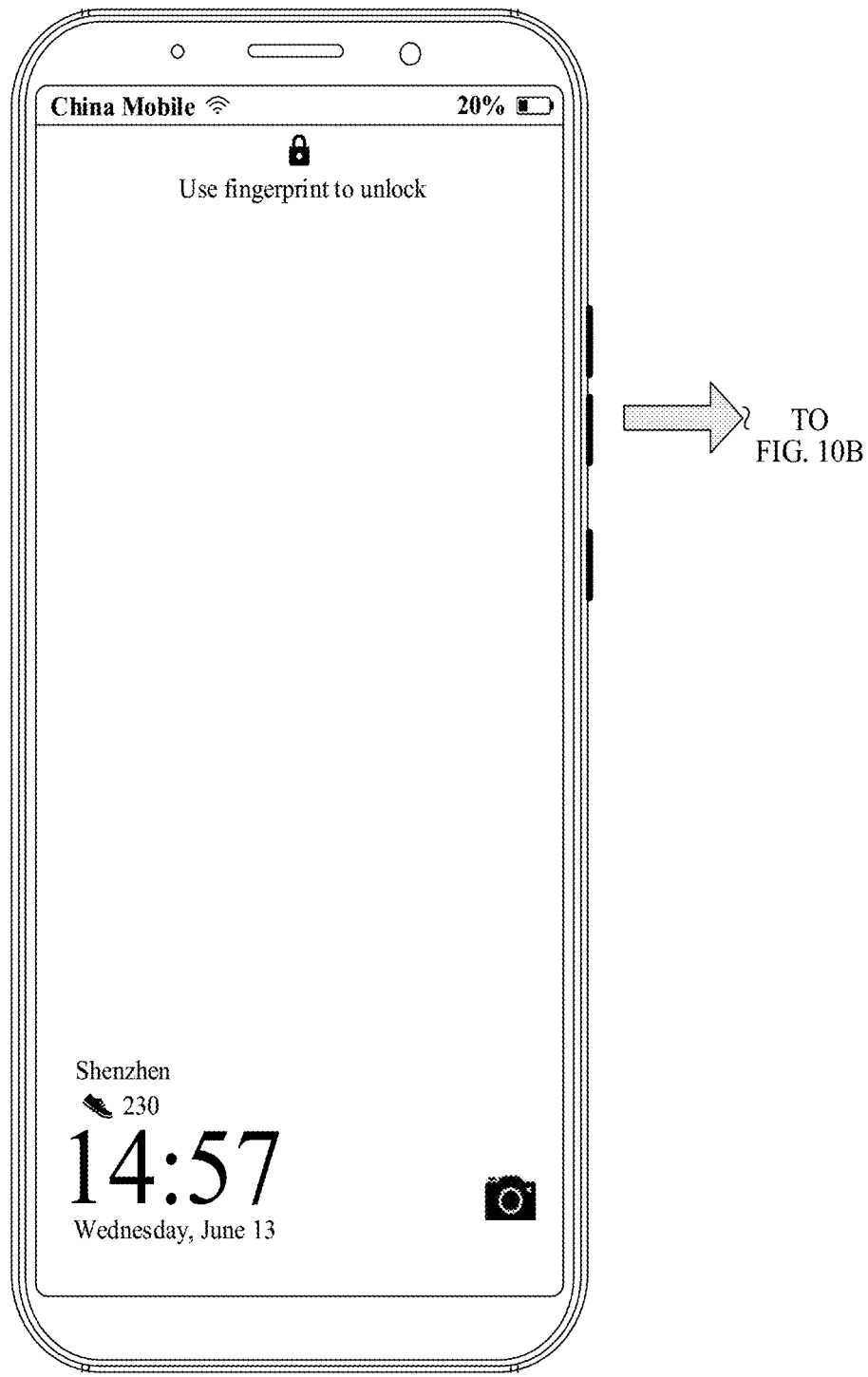
FIG. 10A, FIG. 10B, and FIG. 10C are a schematic diagram 1 of a user operation interface of a user interface display method of a terminal according to an embodiment of the present invention.
Figure 10B:
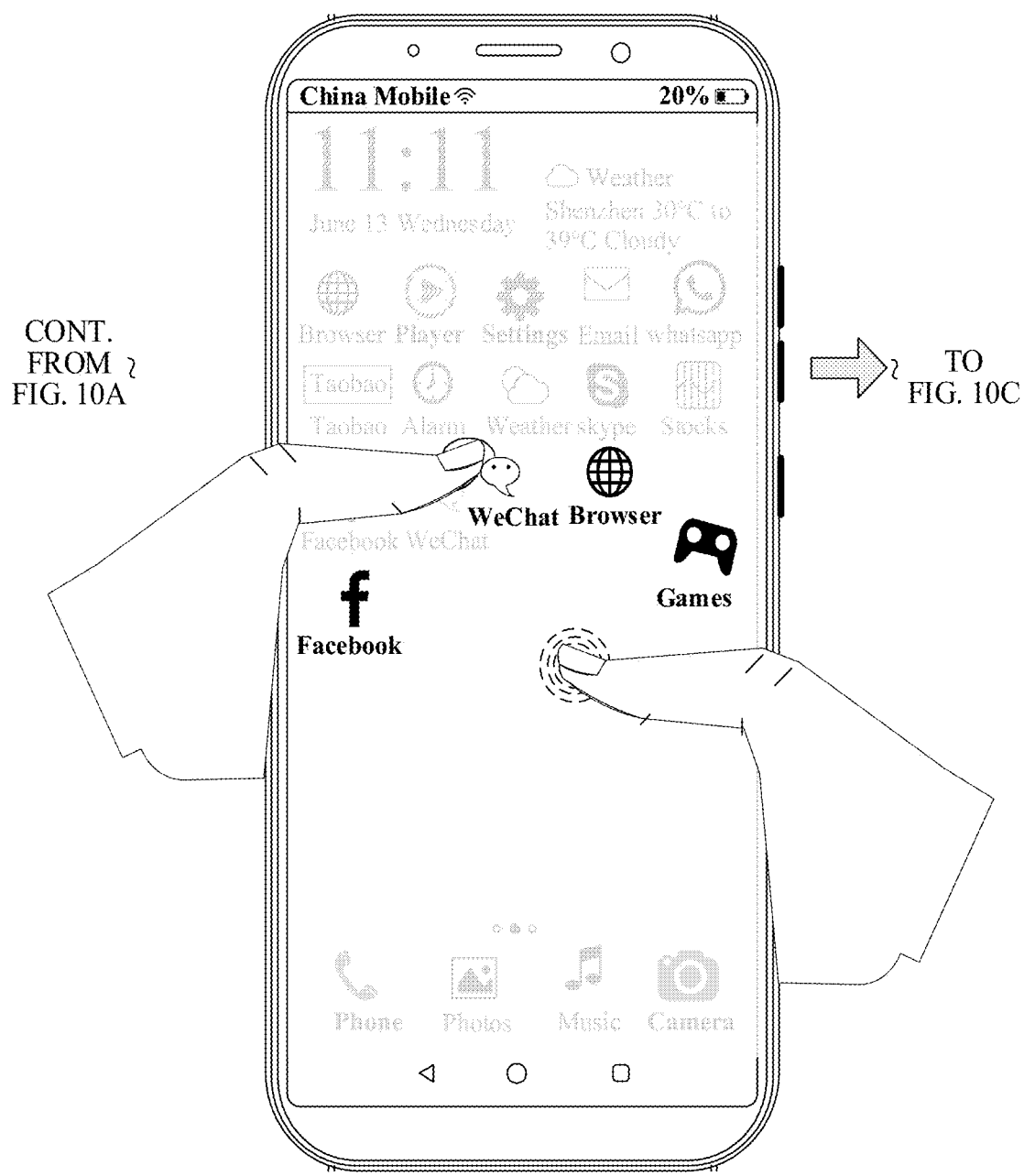
Figure 10C:
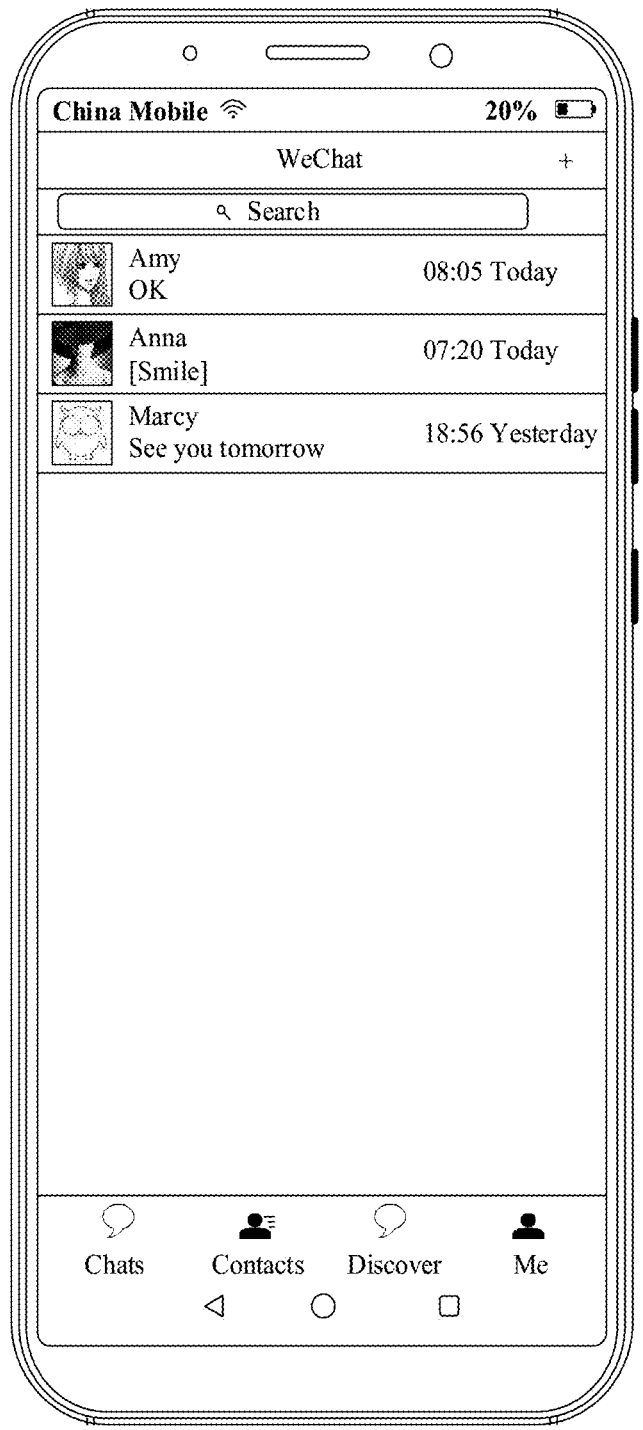

3. One finger keeps touching or pressing the touchscreen, and another finger taps a shortcut of a function (including an application). For example, as shown in FIG. 10A, FIG. 10B, and FIG. 10C, a right thumb keeps pressing the touchscreen, and a left thumb taps a "WeChat" icon, to open a "WeChat" application.

Figure 11A:
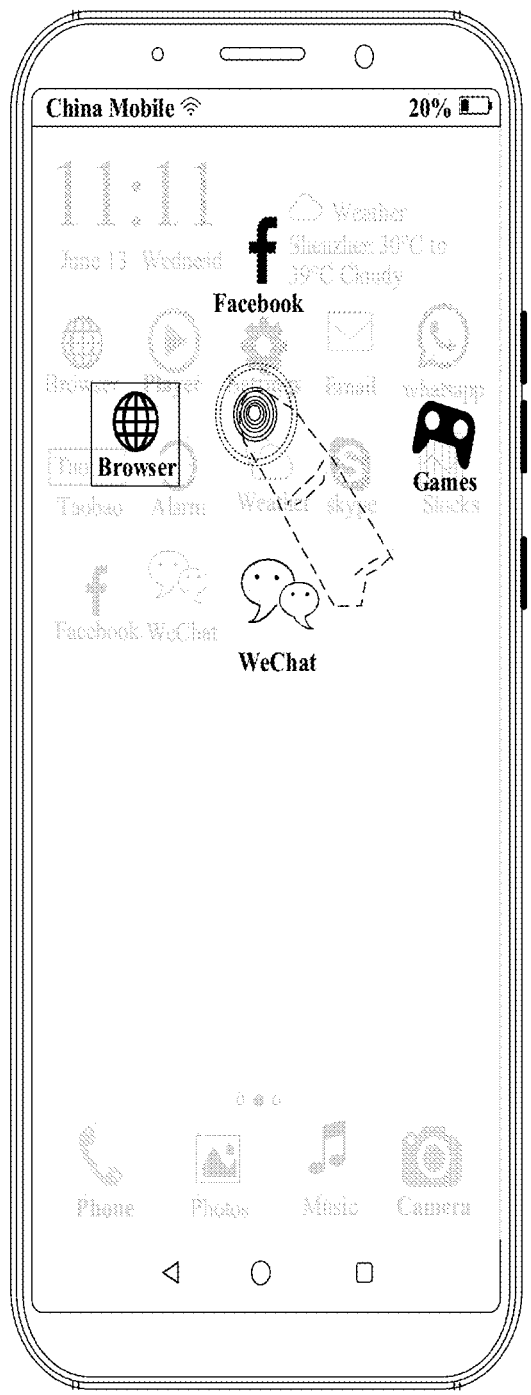
FIG. 11A is a schematic diagram 3 in which a user performs an operation in a third UI interface according to an embodiment of the present invention.
Figure 11B:
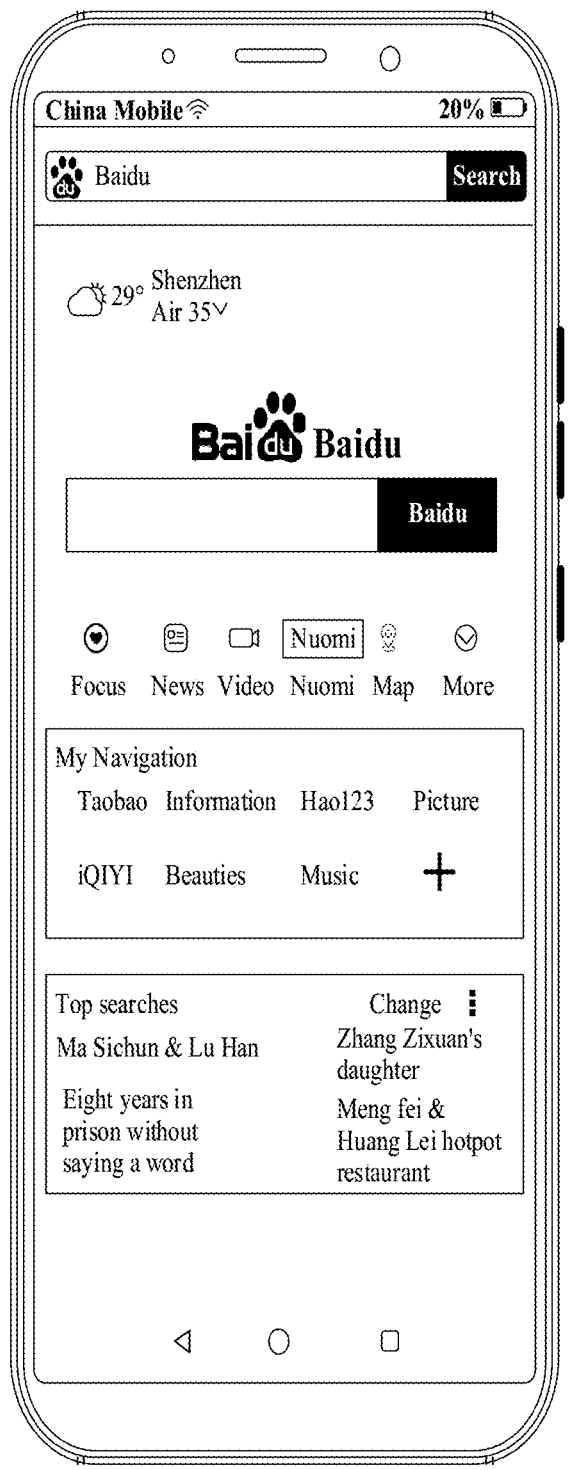
FIG. 11B shows an interface displayed by a terminal after an application is opened based on the operation shown in FIG. 11A according to an embodiment of the present invention.
Figure 11C:
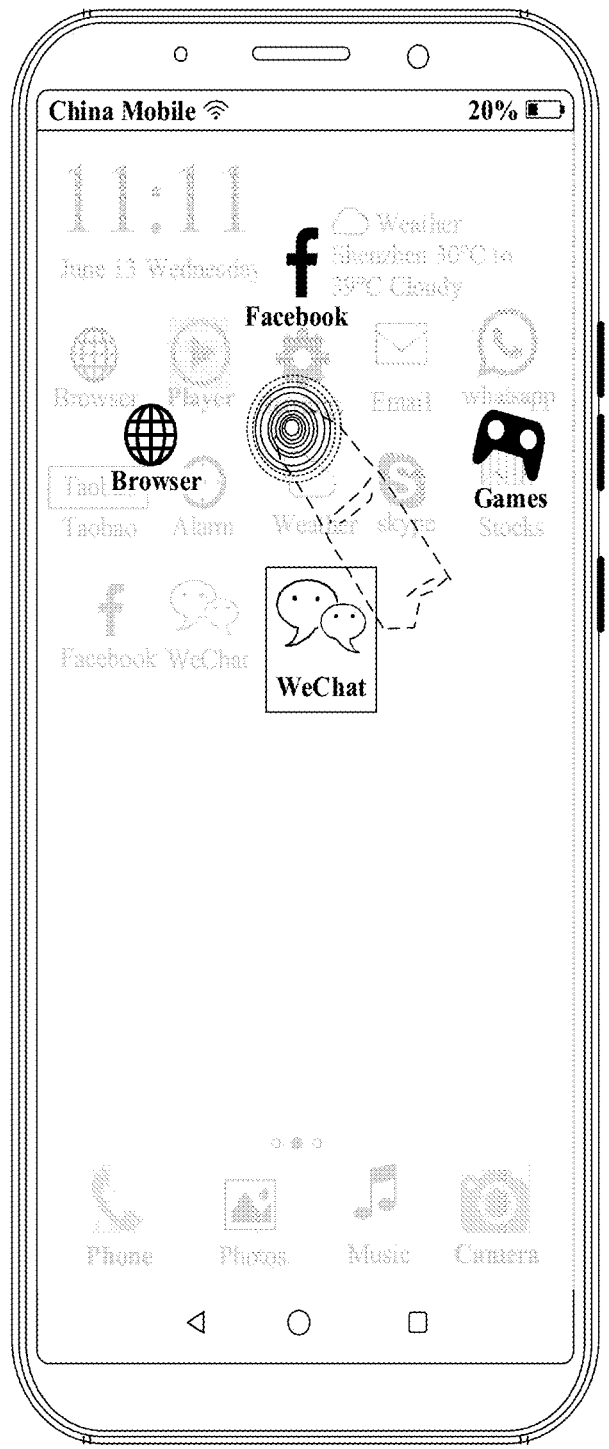
FIG. 11C is a schematic diagram 4 in which a user performs an operation in a third UI interface according to an embodiment of the present invention.
Figure 11D:
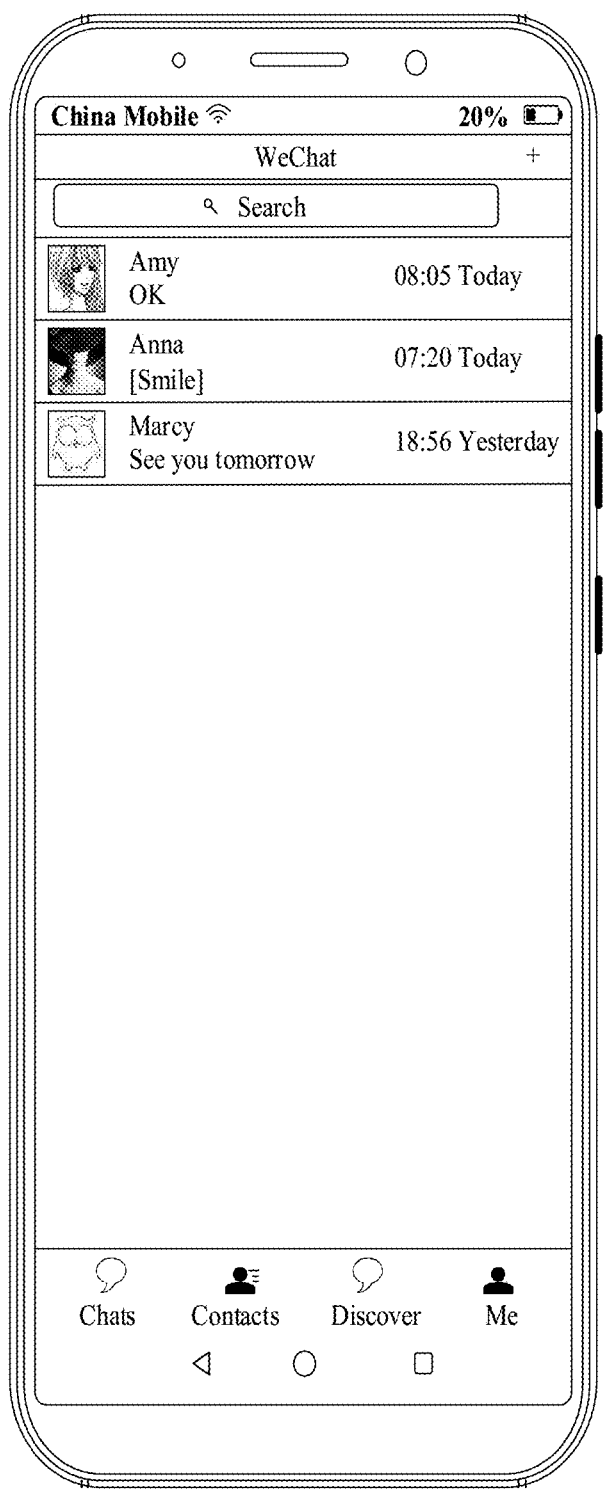
FIG. 11D shows an interface displayed by a terminal after an application is opened based on the operation shown in FIG. 11C according to an embodiment of the present invention.

4. A finger presses the touchscreen, and the terminal determines different shortcuts based on different press forces. In this manner, the touchscreen may detect pressure applied by the user. Based on different pressure, the terminal significantly displays a shortcut corresponding to the pressure, for example, the terminal significantly displays the shortcut through icon floating, through flashing, by placing a tick in an upper right corner, or through framing, to prompt the user that the shortcut corresponds to the pressure at this time. When the user lifts the finger, a function corresponding to the shortcut selected by the user by using the pressure press operation is executed. For example, as shown in FIG. 11A, when the user presses the touchscreen with a relatively light force, a "browser" icon is framed to indicate that the "browser" icon is selected. If the user lifts the finger at this time, a "browser" application is opened (as shown in FIG. 11B). When the "browser" icon is framed to indicate that the "browser" icon is selected, if the user increases the force instead of lifting the hand, as shown in FIG. 11C, a "WeChat" icon is framed to indicate that the "WeChat" icon is selected. If the user lifts the finger at this time, a "WeChat" application is opened (as shown in FIG. 11D).

After the foregoing operation, the terminal is to execute the function corresponding to the shortcut. Certainly, the foregoing operation is not limited in this embodiment of the present invention. The terminal may preset another type of operation manner, and point to shortcuts of different functions by using different operations of the type of operation manner, to determine to execute a corresponding function. That is, the user triggers a corresponding shortcut by using the second operation.

In the foregoing implementation, the user performs an unlock operation by touching or pressing the touchscreen. When determining that the user does not stop the operation, the terminal presents the UI that provides the quick entry of the function of the terminal. Without making the finger leave the touchscreen, the user may continue to trigger, by using an operation on the touchscreen, the terminal to execute the function of the terminal, thereby improving operation efficiency and improving user experience.

Figure 12A:
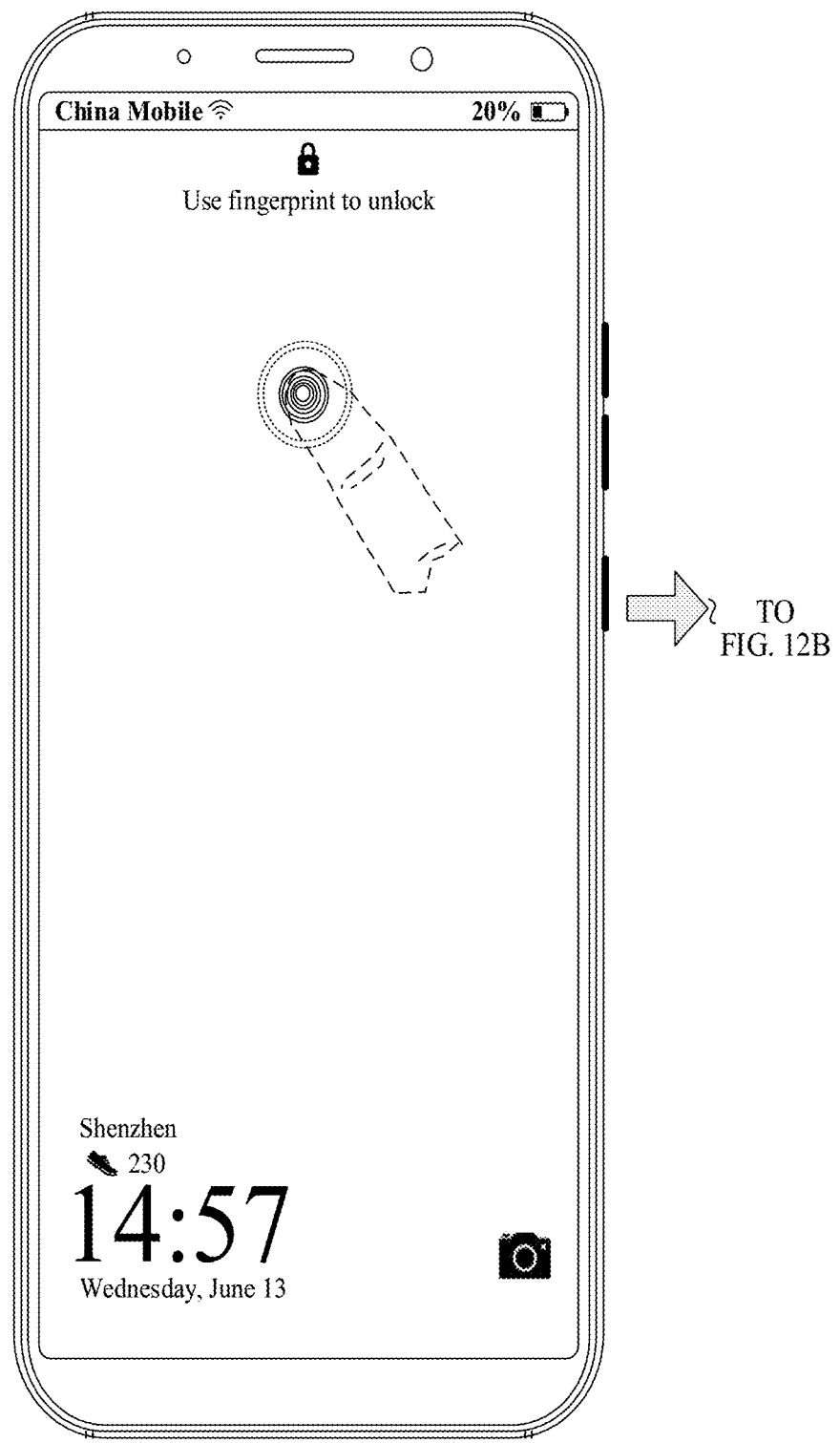
FIG. 12A is a schematic diagram in which a user performs unlocking by using a rear-facing fingerprint in a lock screen of a terminal according to an embodiment of the present invention.
Figure 12B:
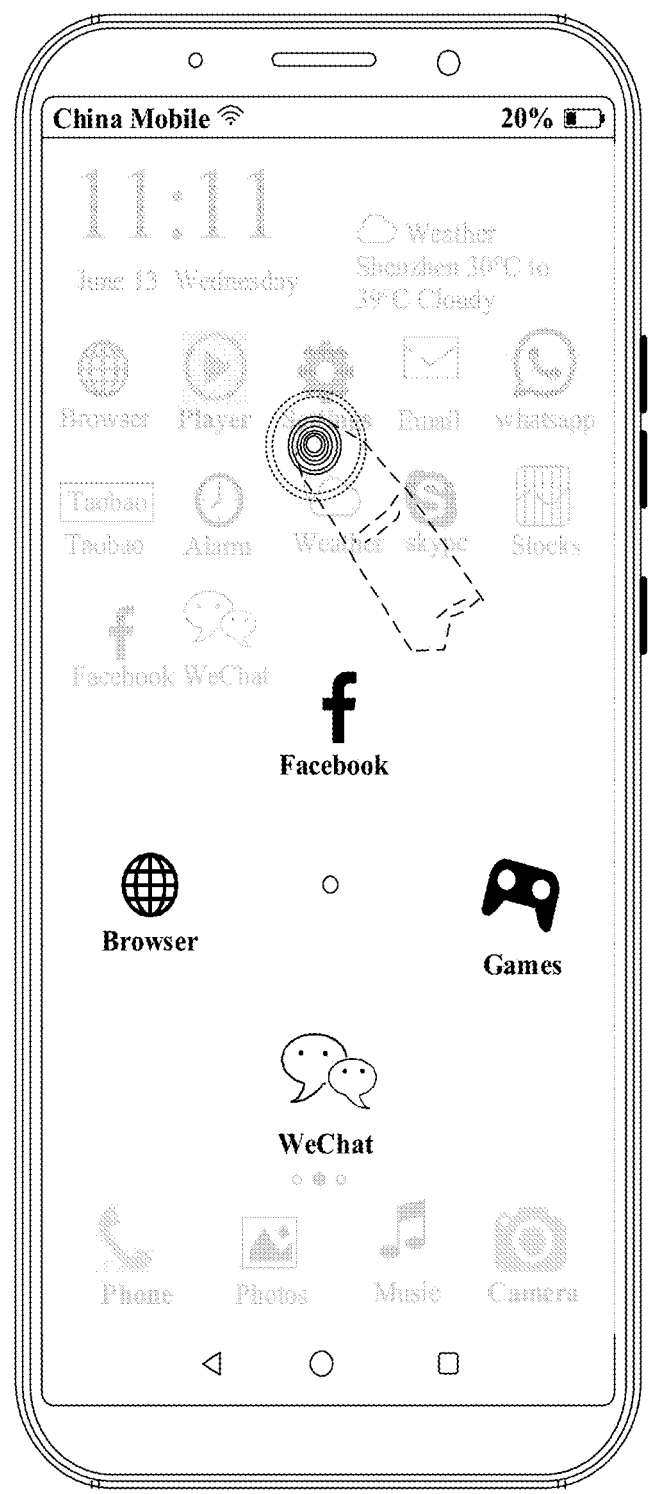
FIG. 12B shows a third UI displayed by a terminal based on the operation shown in FIG. 12A according to an embodiment of the present invention.
Figure 12C:
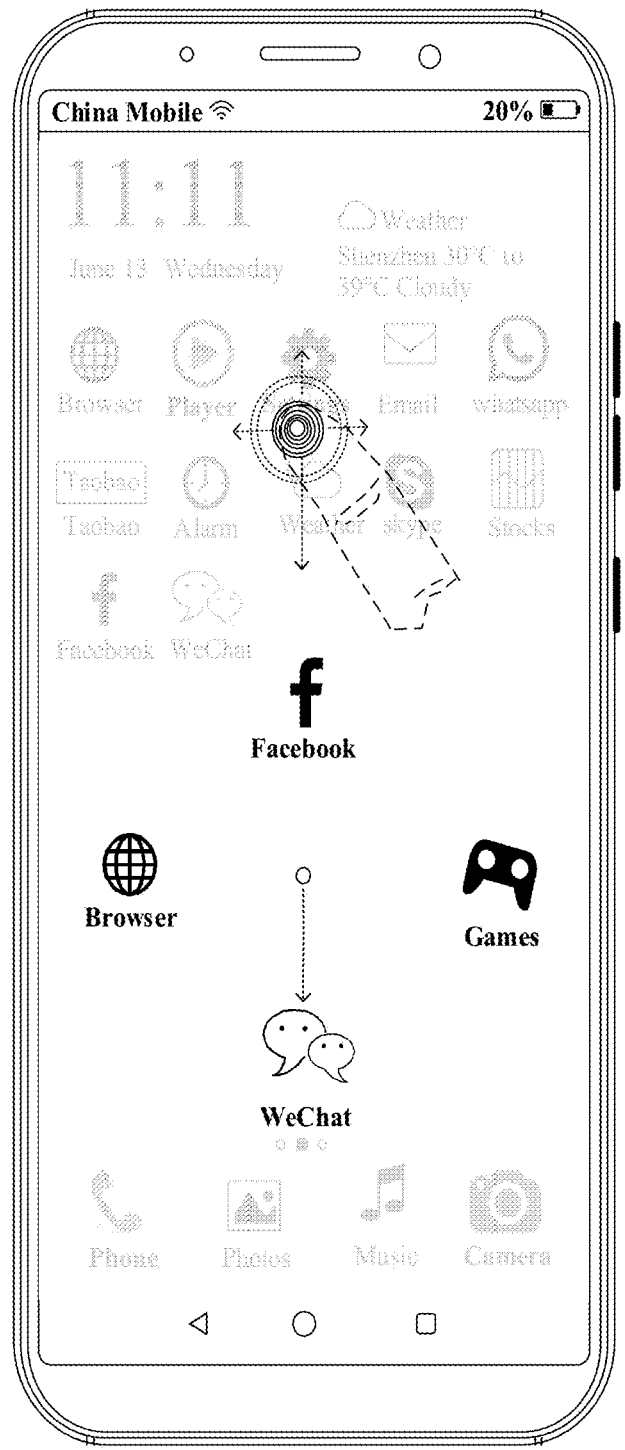
FIG. 12C is a schematic diagram in which a user performs an operation in the UI shown in FIG. 12B according to an embodiment of the present invention.
Figure 12D:
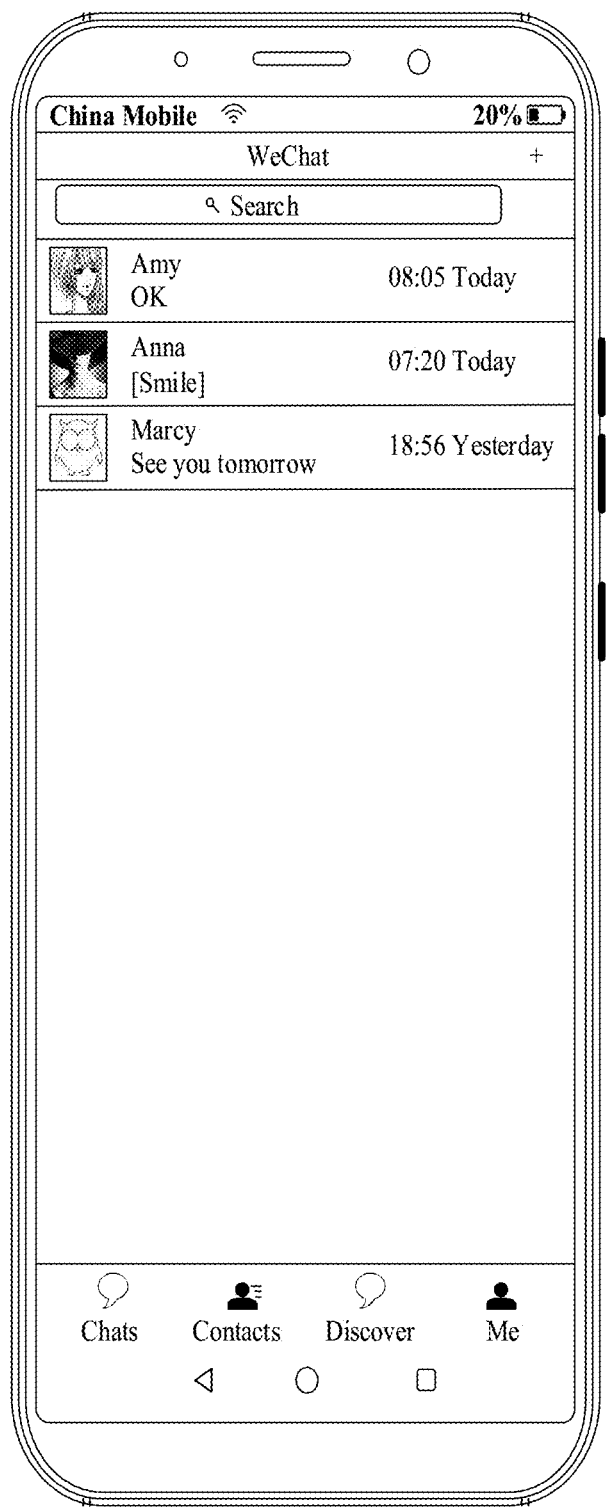
FIG. 12D shows an interface displayed by a terminal after an application is opened based on the operation shown in FIG. 12C according to an embodiment of the present invention.

In an embodiment of the present invention, the terminal may alternatively detect, by using a fingerprint sensor disposed outside the screen of the terminal, the first operation and the second operation that are entered by the user. For example, the terminal may detect the first operation and the second operation by using a fingerprint sensor disposed on the back (relative to the screen) of the terminal. As shown in FIG. 12, if matched fingerprint input is detected in a lock screen shown in FIG. 12A, and the user does not lift the finger, as shown in FIG. 12B, the third UI is displayed. When the third UI displays the shortcut, the rear-facing fingerprint sensor may detect a movement direction of the finger of the user, for example, a direction from top to bottom or from left to right. In this embodiment, when the terminal displays the third UI, a reference point (for example, a flashing dot or cursor, as shown in FIG. 12C) is displayed in the third UI, and a shortcut triggered by the second operation is determined based on a location relationship of the reference point relative to a shortcut and a direction of the second operation. For example, the third UI displays four shortcuts: a shortcut A (for example, "Facebook") located above the reference point, a shortcut B (for example, "WeChat") located below the reference point, a shortcut C (for example, "Browser") located on the left of the reference point, and a shortcut D (for example, "Game") located on the right of the reference point. If the terminal detects, by using the rear-facing fingerprint sensor, that the second operation of the user is a sliding operation from top to bottom on the sensor, the terminal determines that the shortcut B is triggered, and opens the WeChat application, as shown in FIG. 12D. If the terminal detects, by using the rear-facing fingerprint sensor, that the second operation of the user is a sliding operation from left to right on the sensor, the terminal determines that the shortcut D is triggered, and opens the "Game" application.

In one of the foregoing implementations, the user performs the first operation by using the first sensor, and performs the third operation by using the second sensor. If the third operation starts before the terminal detects the first operation that meets the preset unlock condition, and the duration during which the third operation exists after the terminal detects the first operation that meets the preset unlock condition is greater than the third threshold duration, it is determined that the user does not stop the input operation on the terminal after entering the first operation. In this case, the terminal displays the third UI. In this implementation, both the second operation and the third operation may be entered by using the second sensor. For example, the second sensor is a touch sensor. The user may continuously enter the third operation and the second operation by using the touch sensor. The user can enable a specific function of the terminal by using a coherent touch action before and after unlocking. Therefore, operation efficiency is high and user experience is good.

Figure 9B:
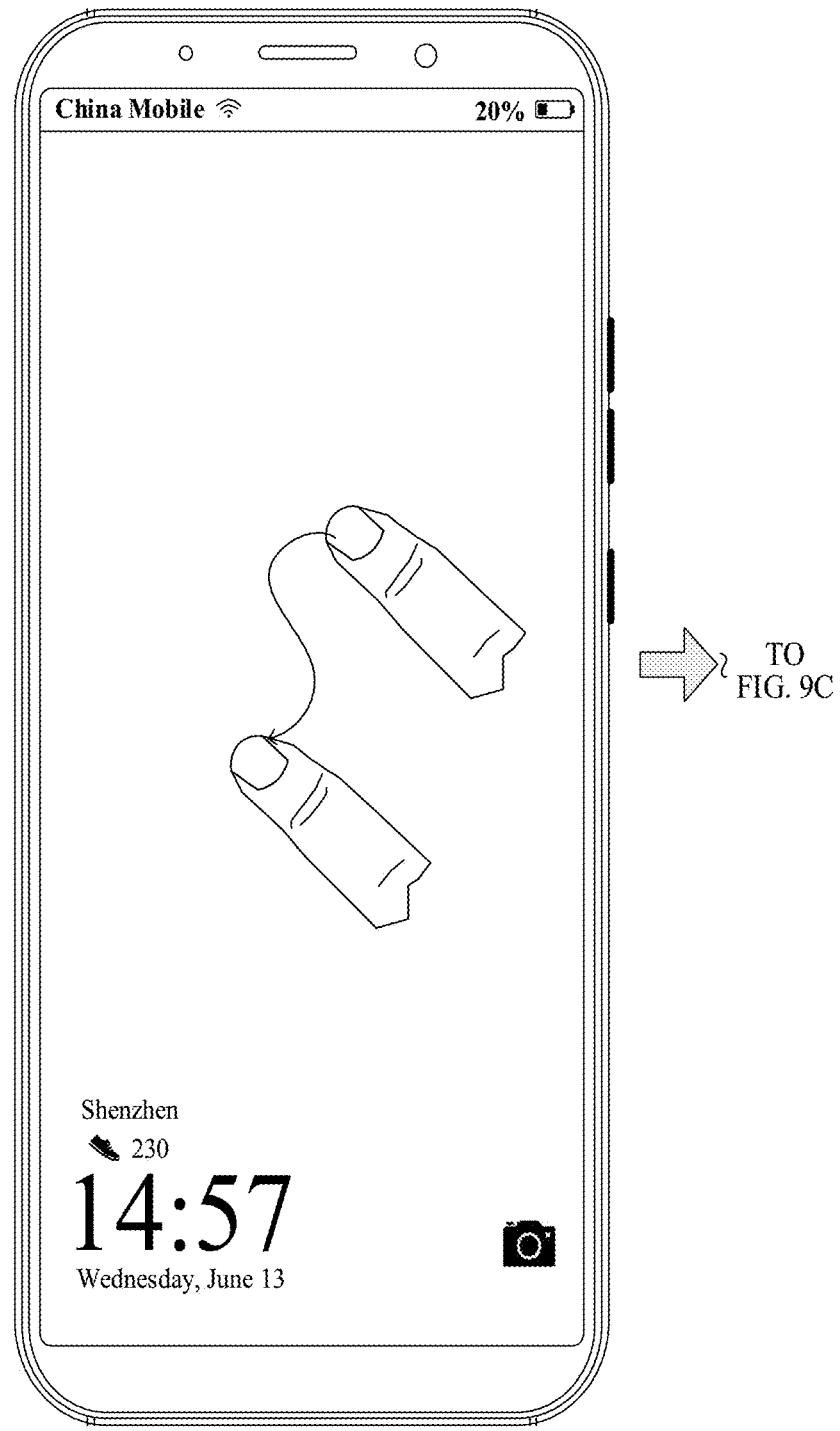
FIG. 9B is a schematic diagram 2 in which a user performs an operation in a third UI interface according to an embodiment of the present invention.
Figure 9C:
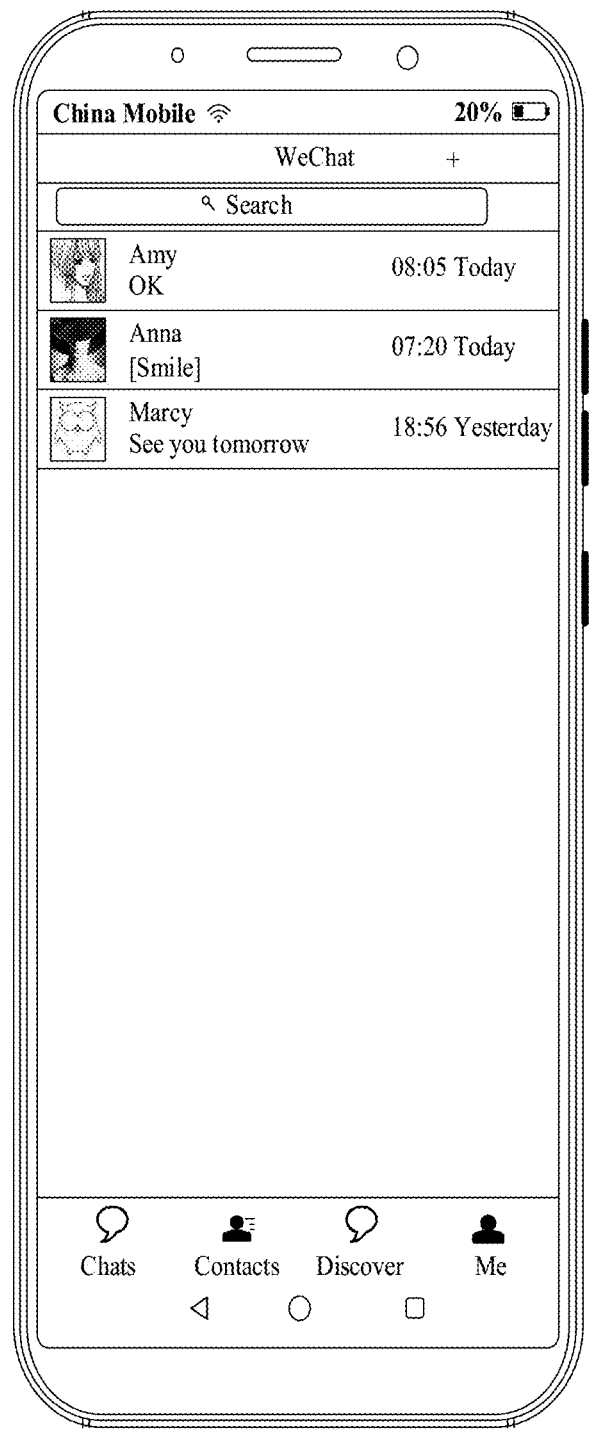
FIG. 9C shows an interface displayed by a terminal after an application is opened based on the operation shown in FIG. 9B according to an embodiment of the present invention.

When the third UI provides the quick entry of the function of the terminal in manner 2, the second operation may be that the user draws a prompt gesture pattern in the third UI, and the terminal identifies a gesture of the user, and executes a function corresponding to the gesture. For example, as shown in FIG. 9B, if a gesture pattern "S" corresponds to a "WeChat" application, when the terminal presents the third UI, the user draws an "S" track on the touchscreen with a finger (as shown in FIG. 9B), and the terminal opens "Calendar" (as shown in FIG. 9C).

It should be noted that, in an implementation of the present invention, after the third UI is displayed, if the second operation of the user is not detected, the terminal may be unlocked directly to display an unlocked interface, for example, display the second UI; for example, when the third UI provides the quick entry of the function of the terminal in manner 1, the user does not enter the second operation that is used to trigger a shortcut. For example, after the third UI is displayed, the user directly stops operating the terminal (for example, the finger leaves the touchscreen), or an operation performed after the third UI is displayed does not conform to a preset setting of the terminal. For example, in an embodiment, the preset second operation is that the finger moves to a shortcut and the hand is lifted, but the terminal detects only the movement of the finger of the user and the movement does not reach a shortcut displayed in the third UI. In this case, the terminal may unlock the screen to display the second UI.

For another example, when the third UI provides the quick entry of the function of the terminal in manner 2, the terminal detects that the user directly stops operating the terminal in the third UI, or does not detect a preset gesture. In this case, the terminal may unlock the screen to display the second UI.

The user interface display method provided in the embodiments of this application may be applied to any terminal device that can display an interface, such as a mobile phone, a tablet computer, a wearable device, a vehicle-mounted device, an augmented reality (augmented reality, AR) device/a virtual reality (virtual reality, VR) device, a notebook computer, an ultra-mobile personal computer (ultra-mobile personal computer, UMPC), a netbook, or a personal digital assistant (personal digital assistant, PDA). The terminal device is not limited in the embodiments of this application.

Figure 1:
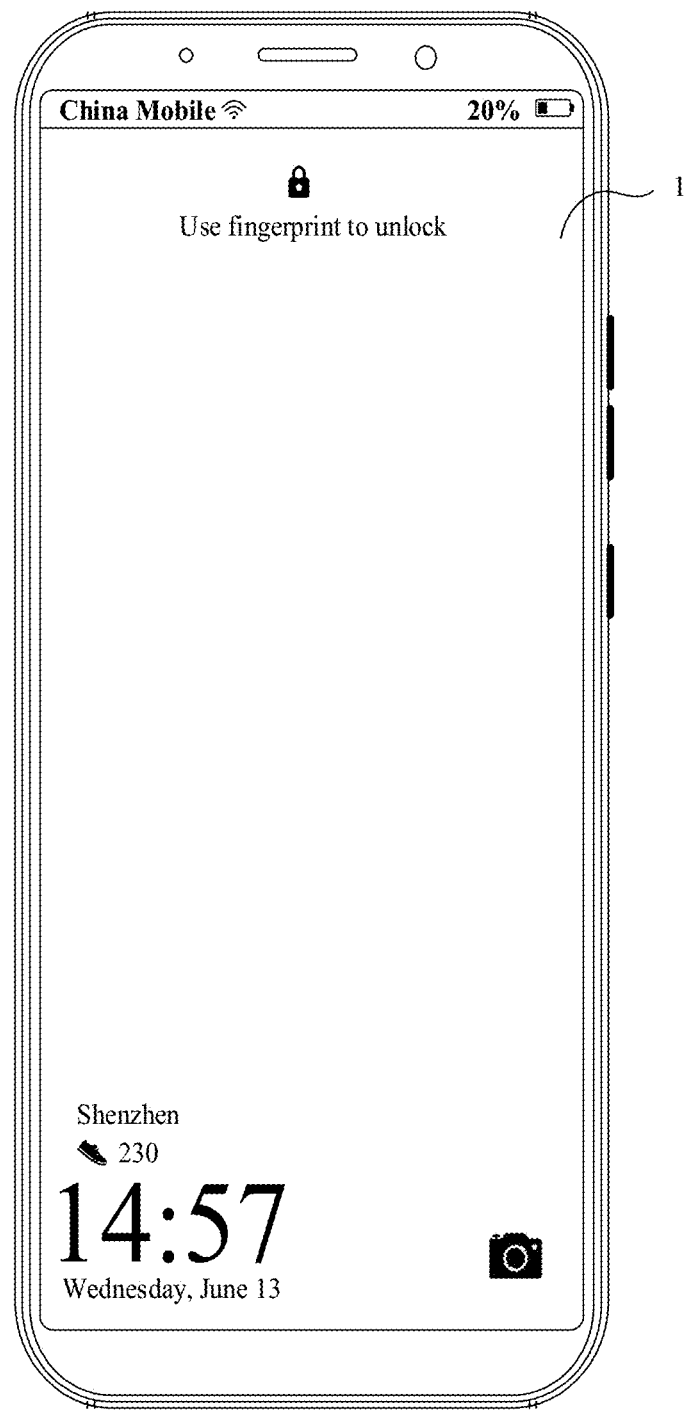
FIG. 1 is a schematic diagram of a lock screen of a terminal in the prior art.
Figure 2:
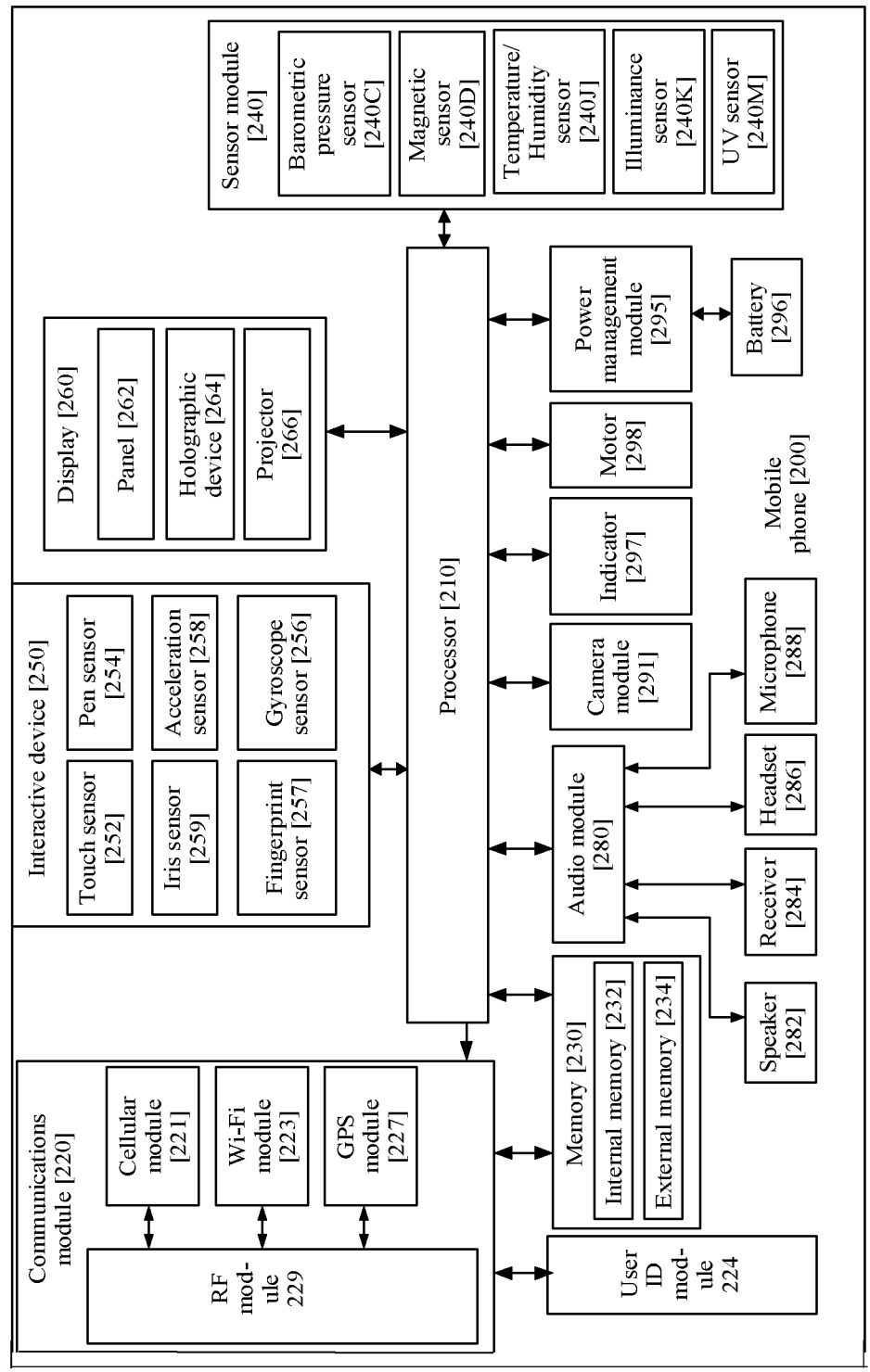
FIG. 2 is a schematic structural diagram of a terminal according to an embodiment of the present invention.

An example in which the terminal in the embodiments of this application is a mobile phone is used to describe a general hardware architecture of the mobile phone. As shown in FIG. 2, a mobile phone 200 may include a communications module 220, a memory 230, a sensor module 240, an interactive device 250, a display 260, an audio module 280, a processor 210, a camera module 291, a power management module 295, and the like. These components may be connected by using a bus, or may be directly connected. A person skilled in the art may understand that the mobile phone structure shown in FIG. 2 constitutes no limitation on the mobile phone, and the mobile phone may include more components than those shown in FIG. 2, or combine some components, or have different component deployments.

The communications module 220 is configured to communicate with another network entity, for example, receive information from a server or send related data to the server. The communications module 220 may include a radio frequency (radio frequency, RF) module 229, a cellular module 221, a wireless fidelity (wireless fidelity, WIFI) module 223, a GPS module 227, and the like. The RF module 229 may be configured to receive and send information, or receive and send a signal in a call process. Particularly, the RF module 229 sends received information to the processor 210 for processing, and sends a signal generated by the processor 210. Generally, an RF circuit 21 may include but is not limited to an antenna, at least one amplifier, a transceiver, a coupler, a low noise amplifier (low noise amplifier, LNA), a duplexer, and the like. In addition, the RF circuit 21 may further communicate with a network and another device through wireless communication. The cellular module 221 and the WIFI module 223 may be configured to be connected to a network. The GPS module may be configured to perform positioning or navigation.

The processor 210 is a control center of the mobile phone 200, is connected to all parts of the entire mobile phone by using various interfaces and lines, and performs various functions of the mobile phone 200 and data processing by running or executing a software program and/or a module that are/is stored in the memory 230 and by invoking data stored in the memory 230, to overall monitor the mobile phone 200. During specific implementation, in an embodiment, the processor 210 may include one or more processing units, and an application processor and a modem processor may be integrated into the processor 210. The application processor mainly processes an operating system, a graphical user interface, an application program, and the like. The modem processor mainly processes wireless communication. It may be understood that the modem processor may alternatively not be integrated into the processor 210.

The memory 230 may be configured to store data, a software program, and a module; and may be a volatile memory (volatile memory), for example, a random access memory (random-access memory, RAM), or may be a nonvolatile memory (non-volatile memory), for example, a read-only memory (read-only memory, ROM), a flash memory (flash memory), a hard disk (hard disk drive, HDD), or a solid-state drive (solid-state drive, SSD), or may be a combination of the foregoing types of memories. Specifically, the memory 230 may store program code. The program code is used to enable the processor 210 to perform, by executing the program code, the user interface method provided in the embodiments of this application. The memory 230 may include an internal memory 232 and an external memory 234.

In this embodiment of the present invention, the processor 210 executes the code in the memory 230 to: determine whether a first operation received by using a sensor meets a preset unlock condition (in other words, perform step S102 in the method embodiment part and implement various specific implementations of the step); and when determining that the first operation meets the unlock condition, continue to determine, based on a signal received by the sensor, whether a user stops operating the terminal after entering the first operation (in other words, perform step S106 in the method embodiment part and implement various specific implementations of the step). When implementing step S106, the processor 210 may set a timer to determine whether the user stops the input operation on the terminal after entering the first operation. If the terminal starts the timer after detecting the first operation that meets the unlock condition, and detects, before the timer expires, that the user stops the input operation on the terminal, for example, does not continuously detect a touch signal before the timer expires, it means that the user stops the input operation on the terminal after entering the first operation. Certainly, the processor 210 may set a timer at another time to determine whether the user stops the input operation on the terminal after entering the first operation, to implement various determining manners in the method embodiment part. Details are not described herein.

The processor 210 executes the code in the memory 230 to determine that when the first operation does not meet the unlock condition, the terminal device keeps a screen off or displays a lock screen (in other words, perform step S104 in the method embodiment part).

The processor 210 executes the code in the memory 230 to: when determining that the user does not stop operating the terminal after entering the first operation, for example, when detecting, by using the sensor, that the input operation of the user is not stopped, display a third UI by using a display device (for example, the display 260) (in other words, perform step S110 in the method embodiment part and implement various specific implementations of the step). Various presentation forms of the third UI in the method embodiment are embodied by using UI data. The UI data is stored in the memory 230, is read by the processor 210, and is displayed by the display 260.

The processor 210 executes the code in the memory 230 to: when receiving a second operation, determine that a currently displayed UI is the third UI, and execute a function corresponding to the second operation (in other words, perform step S112 in the method embodiment part and implements various specific implementations of the step). Specifically, during implementation of some implementations in the method embodiment, the processor 210 executes the code in the memory 230 to: receive the second operation by using a sensor; and first determine that the currently displayed user interface is the third UI, and then map a track of the second operation to a track in the third UI to determine a shortcut triggered by the second operation of the user. For example, for a touch point detected on a touch sensor 240, coordinates of the touch point on the touch sensor 240 are converted into coordinates on the display 260, to map a track formed by the touch point to the third UI. During implementation of some implementations in the method embodiment, the processor 210 executes the code in the memory 230 to: receive the second operation by using the sensor; and also first determine that the currently displayed interface is the third UI, but need to determine only a shape in which the user touches a touch sensor 252, without performing mapping of the track of the second operation. For example, if the processor 210 determines that the shape is a gesture "S", the processor 210 determines to open a "Calendar" application. Certainly, the processor 210 may alternatively map the touch coordinates of the second operation to the third UI, and then determine a gesture of the second operation.

It should be noted that the processor 210 in this specification is a unit that can complete the foregoing calculation, processing, and control functions. The processor 210 may be an independent component, or may include several separate components. For example, in a specific implementation of the present invention, the processor 210 may include a coprocessor and a main processor. The coprocessor (which may also be referred to as a sensor hub) is configured to centrally control a plurality of sensors and process data collected by the plurality of sensors. In this architecture, data collected by a sensor (for example, the fingerprint sensor, the iris sensor, the facial recognition sensor, or the touch sensor mentioned above) used to unlock the terminal may be processed by the coprocessor. For example, the coprocessor may perform an operation of comparing data collected by the sensor for unlocking with preset unlock data to determine whether the data collected by the sensor for unlocking matches the preset unlock data, and transfer an operation result to the main processor. The main processor completes another operation based on the result. In this architecture, when the coprocessor works, the main processor may sleep, and the main processor does not need to be woken up frequently, thereby reducing power consumption of the terminal.

Certainly, a plurality of cooperated processors may be disposed in the terminal based on another requirement. This is not limited in the present invention.

The sensor module 240 may include a barometric pressure sensor 240C, a magnetic sensor 240D, a temperature/humidity sensor 240J, an illuminance sensor 240K, a UV sensor 240M, and the like. These sensors may be configured to measure environment parameters, so that the processor controls the mobile phone according to a preset policy. For example, these parameter values may be displayed, or a working mode of the mobile phone may be set based on these parameter values. It should be noted that the mobile phone 200 may further include other sensors, such as a distance sensor and an RGB sensor. Details are not described herein.

The interactive device 250 detects an operation performed by the user on the terminal. The interactive device 250 includes a keyboard (not shown in the figure), and also includes a sensor that can detect an operation of the user, for example, a gyroscope sensor 256, configured to detect values of accelerations of the mobile phone in all directions (generally three axes). The gyroscope sensor 256 may detect a value and a direction of gravity when the mobile phone is stationary, and may be applied to an application for identifying a mobile phone posture (for example, a tilt angle of the mobile phone, screen switching between landscape and portrait modes, a related game, or magnetometer posture calibration), a function related to vibration identification (such as a pedometer or a knock), and the like. An acceleration sensor 258 is configured to detect an acceleration of the mobile phone. The two sensors may perceive an action imposed by the user on the mobile phone, for example, screen switching between landscape and portrait modes, and mobile phone shaking. The interactive device 250 further includes a fingerprint sensor 257, an iris sensor 259, a proximity sensor (not shown in the figure), and the like. The fingerprint sensor may be disposed separately from the display, namely, an out-screen fingerprint sensor, for example, a fingerprint sensor disposed on a home button or a rear-facing fingerprint sensor disposed on a rear housing, or may be an in-screen fingerprint sensor. The proximity sensor is a component that can sense proximity of an object. The proximity sensor can recognize proximity of an object according to sensitivity characteristic of a displacement sensor to an approaching object, and output a corresponding switch signal. The distance sensor may be configured to detect a floating event.

The display 260 may include devices such as a display panel 262, a holographic device 264, and a projector 266. The display panel 262 may be configured to display a UI, for example, a graphical user interface (graphical user interface, GUI), on the mobile phone. The graphical user interface includes various controls, various application interfaces, or the like.

The touch sensor 252 and the display panel 262 may also be referred to as a touch display or a touchscreen. The touchscreen may collect a touch operation (for example, an operation performed by a user on the touchscreen or near the touchscreen by using any suitable object or accessory such as a finger or a stylus) performed by the user on the touchscreen or near the touchscreen, and drive a corresponding connection apparatus based on a preset program. The touchscreen may be further configured to display information entered by the user or information (for example, an image captured by using a camera) provided for the user, and various menus of the mobile phone. For example, the touchscreen may be implemented by using a plurality of types such as a resistive type, a capacitive type, an infrared light sensor, and an ultrasonic wave. This is not limited in this embodiment of the present invention. The operation performed by the user near the touchscreen may be referred to as floating touch. The touch operation in this specification includes this floating touch operation. The touchscreen on which floating touch can be performed may be implemented by using a capacitive type touchscreen, an infrared light sensing touchscreen, or an ultrasonic wave touchscreen. The touch operation in the embodiments of the present invention also includes this floating touch operation.

For example, when a target such as a finger is close to or away from a capacitive touchscreen, a current of a self-capacitor and a current of a mutual capacitor in the touchscreen change accordingly, so that the electronic device can detect floating detection. For another example, an infrared light sensing touchscreen may emit light by using an infrared LED and an infrared light emitting diode, and the mobile phone detects screen light reflected back by the target such as the finger of the user, to identify and trace a floating gesture.

The camera module 291 may be configured to collect an image to perform photographing, record a video, scan a two-dimensional code/bar code, or the like, and may be further configured to identify facial information, user expression, user head action, or the like.

The audio module 280 may include a speaker 282, a receiver 284, a headset 286, a microphone 288, and the like, and is configured to collect or play an audio signal.

The power management module 295 may include a battery 296, and is configured to be logically connected to the processor 210 by using a power management system, to implement functions such as charging management, discharging management, and power consumption management by using the power management system.

In addition, the mobile phone 200 may further include function modules such as a user identification module, an indicator, and a motor. Details are not described herein.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method implemented by a terminal, the method comprising:

receiving, by a fingerprint sensor of the terminal, a first operation from a user in an area of a screen of the terminal corresponding to the fingerprint sensor when the screen is off or is displaying a first user interface, wherein the first user interface comprises a lock screen of the terminal, and wherein the first operation comprises a fingerprint input of a finger;

determining, after the fingerprint input matches a preset fingerprint and by a processor and a touch sensor of the terminal, that the finger does not lift from the screen and that a first duration of the finger touching the screen is greater than a preset threshold duration;

displaying, in response to the fingerprint input matching the preset fingerprint, the finger not lifting from the screen, and the first duration being greater than the preset threshold duration, a second user interface, wherein the second user interface comprises one or more shortcuts, and wherein the one or more shortcuts comprises a first shortcut;

receiving, by the touch sensor, a second operation from the user when displaying the second user interface, wherein the second operation meets a preset condition;

determining, based on a layout of the one or more shortcuts in the second user interface and the second operation, a correspondence between the second operation and the first shortcut;

executing, in response to determining the correspondence, a function corresponding to the first shortcut;

receiving, by the touch sensor, a third operation from the user when displaying the second user interface, wherein the third operation does not meet the preset condition; and displaying, in response to the third operation, an unlocked user interface, wherein the unlocked user interface is different with the second user interface.

2. The method of claim 1, further comprising unlocking, in response to the fingerprint input matching the preset fingerprint, the terminal.

3. The method of claim 1, further comprising:
receiving, by the fingerprint sensor, a fourth operation from the user when the screen is off or displays the lock screen, wherein the fourth operation comprises a second fingerprint input of the finger;
determining that the second fingerprint input matches the preset fingerprint; and
displaying, in response to the second fingerprint input matching the preset fingerprint and a second duration of the finger touching the screen being less than the preset threshold duration, the unlocked user interface.

4. The method of claim 1, further comprising displaying an icon of a fingerprint shape in the area when a fingerprint needs to be collected.

5. The method of claim 1, wherein displaying the second user interface comprises displaying the second user interface on the unlocked user interface in a superimposed manner, and wherein the unlocked user interface does not respond to the second operation when the second user interface is displayed on the unlocked user interface.

6. The method of claim 5, wherein displaying the second user interface on the unlocked user interface comprises displaying the unlocked user interface in a transparent or virtualized manner when the second user interface is displayed on the unlocked user interface.

7. The method of claim 1, wherein determining that the finger does not lift from the screen comprises determining that an input operation from the user is continuously operated on the screen.

8. The method of claim 1, wherein determining that the finger does not lift from the screen comprises determining that the finger does not lift from the screen in a time period from a first detection of the first operation to a second detection of the second operation.

9. The method of claim 1, wherein determining that the first duration is greater than the preset threshold duration comprises determining, based on signals collected by the fingerprint sensor and the touch sensor, that the first duration is greater than the preset threshold duration.

10. The method of claim 1, further comprising detecting, by the touch sensor, a touch operation from the user before the first operation is received.

11. The method of claim 1, wherein the second operation comprises the finger moving to the first shortcut and being lifted from the screen after the moving to the first shortcut.

12. The method of claim 1, further comprising displaying a reference point in the second user interface, wherein determining the correspondence comprises determining, based on a location relationship of the reference point relative to the first shortcut and the second operation, the correspondence.

13. A terminal, comprising:
a memory configured to store instructions;
a screen comprising a fingerprint sensor and a touch sensor; and
a processor coupled to the memory and the screen and configured to execute the instructions to cause the terminal to:
receive, by the fingerprint sensor, a first operation from a user in an area of the screen corresponding to the fingerprint sensor when the screen is off or is displaying a first user interface, wherein the first user interface comprises a lock screen of the terminal, and wherein the first operation comprises a fingerprint input of a finger;
determine, after the fingerprint input matches a preset fingerprint and by the processor and the touch sensor of the terminal, that the finger does not lift from the screen and that a first duration of the finger touching the screen is greater than a preset threshold duration;
display, in response to the fingerprint input matching the preset fingerprint, the finger not lifting from the screen, and the first duration being greater than the preset threshold duration, a second user interface, wherein the second user interface comprises one or more shortcuts, and wherein the one or more shortcuts comprises a first shortcut;
receive, by the touch sensor, a second operation from the user when displaying the second user interface, wherein the second operation meets a preset condition;
determine, based on a layout of the one or more shortcuts in the second user interface and the second operation, a correspondence between the second operation and the first shortcut;
execute, in response to determining the correspondence, a function corresponding to the first shortcut;
receive, by the touch sensor, a third operation from the user when displaying the second user interface, wherein the third operation does not meet the preset condition; and
display, in response to the third operation, an unlocked user interface, wherein the unlocked user interface is different with the second user interface.

14. The terminal of claim 13, wherein the processor is further configured to execute the instructions to cause the terminal to unlock, in response to the fingerprint input matching the preset fingerprint, the terminal.

15. The terminal of claim 13, wherein the processor is further configured to execute the instructions to cause the terminal to:
receive, by the fingerprint sensor, a fourth operation from the user when the screen is off or displays the lock screen, wherein the fourth operation comprises a second fingerprint input of the finger;
determine that the second fingerprint input matches the preset fingerprint; and
display, in response to the second fingerprint input matching the preset fingerprint and a second duration of the finger touching the screen being less than the preset threshold duration, the unlocked user interface.

16. The terminal of claim 13, wherein the processor is further configured to execute the instructions to cause the terminal to display an icon of a fingerprint shape in the area when a fingerprint needs to be collected.

17. The terminal of claim 13, wherein the processor is further configured to display the second user interface by displaying the second user interface on the unlocked user interface in a superimposed manner, and wherein the unlocked user interface does not respond to the second operation when the second user interface is displayed on the unlocked user interface.

18. The terminal of claim 17, wherein the processor is further configured to display the unlocked user interface in a transparent or virtualized manner when the second user interface is displayed on the unlocked user interface.

19. A computer program product comprising instructions stored on a non-transitory computer-readable medium that, when executed by a processor, cause a terminal to:
receive, by a fingerprint sensor of the terminal, a first operation from a user in an area of a screen of the terminal corresponding to the fingerprint sensor when the screen is off or is displaying a first user interface, wherein the first user interface comprises a lock screen of the terminal, and wherein the first operation comprises a fingerprint input of a finger;
determine, after the fingerprint input matches a preset fingerprint and by the processor and a touch sensor of the terminal, that the finger does not lift from the screen and that a first duration of the finger touching the screen is greater than a preset threshold duration;
display, in response to the fingerprint input matching the preset fingerprint, the finger not lifting from the screen, and the first duration being greater than the preset threshold duration, a second user interface, wherein the second user interface comprises one or more shortcuts, and wherein the one or more shortcuts comprises a first shortcut;
receive, by the touch sensor, a second operation from the user when displaying the second user interface, wherein the second operation meets a preset condition;
determine, based on a layout of the one or more shortcuts in the second user interface and the second operation, a correspondence between the second operation and the first shortcut;
execute, in response to determining the correspondence, a function corresponding to the first shortcut;
receive, by the touch sensor, a third operation from the user when displaying the second user interface, wherein the third operation does not meet the preset condition; and
display, in response to the third operation, an unlocked user interface.

20. The computer program product of claim 19, wherein the instructions further cause the terminal to:
receive, by the fingerprint sensor of the terminal, a fourth operation from the user when the screen is off or displays the lock screen, wherein the fourth operation comprises a second fingerprint input of the finger;
determine that the second fingerprint input matches the preset fingerprint; and
display, in response to the second fingerprint input matching the preset fingerprint and a second duration of the finger touching the screen being less than the preset threshold duration, the unlocked user interface.

\* \* \* \* \*

UNITED STATES PATENT AND TRADEMARK OFFICE
CERTIFICATE OF CORRECTION

| | |
|---|---|
| PATENT NO. | : 11,941,910 B2 |
| APPLICATION NO. | : 17/948463 |
| DATED | : March 26, 2024 |
| INVENTOR(S) | : Weiqiang Gao and Chuang Cui |

It is certified that error appears in the above-identified patent and that said Letters Patent is hereby corrected as shown below:

On the Title Page

Page 2, (56) References Cited, Foreign Patent Documents: "IN 105447369 A 3/2016" should read "CN 105447369 A 3/2016"

Signed and Sealed this
Thirtieth Day of April, 2024

Katherine Kelly Vidal
*Director of the United States Patent and Trademark Office*